(12) United States Patent
Knaplund

(10) Patent No.: US 11,681,207 B2
(45) Date of Patent: Jun. 20, 2023

(54) SYSTEM AND METHOD OF ACTIVELY REDUCING AN APPEARANCE OF A SEAM IN A MIRROR ARRAY

(71) Applicant: FLIGHTSAFETY INTERNATIONAL INC., Melville, NY (US)

(72) Inventor: Justin K. Knaplund, The Hills, TX (US)

(73) Assignee: FLIGHTSAFETY INTERNATIONAL INC., Melville, NY (US)

( * ) Notice: Subject to any disclaimer, the term of this patent is extended or adjusted under 35 U.S.C. 154(b) by 0 days.

(21) Appl. No.: 17/512,391

(22) Filed: Oct. 27, 2021

(65) Prior Publication Data

US 2022/0128891 A1   Apr. 28, 2022

Related U.S. Application Data

(60) Provisional application No. 63/106,710, filed on Oct. 28, 2020.

(51) Int. Cl.
*G03B 21/13* (2006.01)
*G09B 9/32* (2006.01)
(Continued)

(52) U.S. Cl.
CPC ............ *G03B 21/13* (2013.01); *G03B 21/56* (2013.01); *G09B 9/326* (2013.01); *H05B 47/11* (2020.01)

(58) Field of Classification Search
CPC ........ G03B 21/10; G03B 21/13; G03B 21/56; G03B 21/60; G03B 21/145; G03B 21/208;
(Continued)

(56) References Cited

U.S. PATENT DOCUMENTS 6,219,099 B1 * 4/2001 Johnson .................. H04N 9/12
348/E17.005
6,224,218 B1 * 5/2001 Turner .................... G09B 9/326
359/451
(Continued)

FOREIGN PATENT DOCUMENTS

JP      2017-527111    9/2017
WO   WO 2004/027496    4/2004
(Continued)

OTHER PUBLICATIONS

"Collimated beam," Wikipedia, page last edited Mar. 14, 2020, retrieved May 25, 2020, from https://en.wikipedia.org/wiki/Collimated_beam, 4 pages.
(Continued)

*Primary Examiner* — Sultan Chowdhury
(74) *Attorney, Agent, or Firm* — Sheridan Ross P.C.

(57) ABSTRACT

Systems and methods to reduce the appearance of a seam in an image reflected onto a mirror array from a screen is provided. The systems and methods may include a light source to emit light into a seam between a pair of mirrors of the mirror array; a camera for taking a picture of the image displayed on the screen and yielding image data from the picture; and a control system in communication with the light source and the camera. The control system may be operable to cause the light source to emit light of a first color into a first portion of the seam and to emit light of a second color into a second portion of the seam based on the image data, thereby providing colored light in the seam to substantially match colors in the image reflected onto pair of mirrors adjacent to the seam.

20 Claims, 10 Drawing Sheets

(51) Int. Cl.
    *G03B 21/56*     (2006.01)
    *H05B 47/11*     (2020.01)

(58) Field of Classification Search
    CPC ............ G03B 21/2013; G03B 21/2033; G03B 21/2053; G03B 21/2066; G03B 17/54; G03B 17/55; G03B 17/561; G03B 17/563; G09B 9/32; G09B 9/42; G09B 9/46; G09B 9/323; G09B 9/326; H05B 47/11; H05B 47/125
    See application file for complete search history.

(56) References Cited

U.S. PATENT DOCUMENTS

| | | | |
|---|---|---|---|
| 7,111,943 B2* | 9/2006 | Agostinelli | H04N 5/7416 359/451 |
| 9,470,967 B1* | 10/2016 | Vorst | H04N 9/3147 |
| 10,113,707 B2 | 10/2018 | Norton | |
| 10,338,875 B2 | 7/2019 | Norton | |
| 10,634,987 B1* | 4/2020 | Xiao | G03B 35/20 |
| 2008/0002161 A1 | 1/2008 | Streid et al. | |
| 2008/0206720 A1 | 8/2008 | Nelson | |
| 2010/0123880 A1* | 5/2010 | Oren | G03B 21/28 359/451 |
| 2017/0206799 A1* | 7/2017 | Bell | H04N 9/3164 |
| 2017/0284626 A1 | 10/2017 | Norton | |
| 2017/0287411 A1* | 10/2017 | Norton | G09G 3/003 |
| 2020/0159104 A1 | 5/2020 | Spiegelman et al. | |

FOREIGN PATENT DOCUMENTS

| | | |
|---|---|---|
| WO | WO 2016/170365 | 10/2016 |
| WO | WO 2020/106720 | 5/2020 |

OTHER PUBLICATIONS

"Full flight simulator," Wikipedia, page last edited Jan. 13, 2020, retrieved Aug. 20, 2020, from https://en.wikipedia.org/wiki/Full_flight_simulator#collimated_cross-cockpit-displays, 2 pages.

Invitation to Pay Additional Fees for International (PCT) Patent Application No. PCT/US2021/056757, dated Dec. 23, 2021, 2 pages.

International Search Report and Written Opinion for International (PCT) Patent Application No. PCT/US2021/056757, dated Feb. 15, 2022, 30 pages.

\* cited by examiner

SYSTEM AND METHOD OF ACTIVELY REDUCING AN APPEARANCE OF A SEAM IN A MIRROR ARRAY

CROSS-REFERENCE TO RELATED APPLICATIONS

The present application claims the benefit of and priority, under 35 U.S.C. § 119(e), to U.S. Provisional Application Ser. No. 63/106,710, filed on Oct. 28, 2020, entitled "SYSTEM AND METHOD OF ACTIVELY REDUCING AN APPEARANCE OF A SEAM IN A MIRROR ARRAY," the entire disclosure of which is hereby incorporated herein by reference, in its entirety, for all that it teaches and for all purposes.

FIELD

The present disclosure is related generally to seam reduction for a mirror array. More particularly, the present disclosure provides systems and methods to actively reduce the appearance of a seam between two adjacent mirrors in an image as viewed by a user. A light source is provided for emitting light into the seam that matches light of the image displayed adjacent to seam.

BACKGROUND

An advanced simulator (e.g., a flight simulator) to train a user to operate a vehicle typically displays an image to the user depicting an environment surrounding the vehicle. The realism of the image is achieved by collimating the light (and thus, the image) to the user, which renders the image at infinity focus. Large mirrors are used to collimate the light from a screen. Simulators utilizing rigid mirrors frequently include an array of 3-7 mirrors to achieve the necessary field of view. However, gaps or seams are present between the mirrors to allow for mirror expansion or movement. Although the gaps may only be about six-hundredths of an inch wide, the gaps do not reflect the light of the image and appear as dark lines to the user. Such lines may be distracting to the observer or user and decrease the realism and effectiveness of the training simulator.

Accordingly, there is a need for systems and methods for actively reducing the appearance of seams in a mirror array as viewed by the observer or user.

SUMMARY

It is one aspect of the present disclosure to provide a system to reduce the appearance of a seam in an image reflected onto a mirror array from a screen. In at least one embodiment, the system comprises: (1) a light source to emit light into the seam defined by a void between a pair of mirrors of the mirror array, the light source positioned proximate to a rear surface of the mirror array; (2) a camera to take a picture of the image projected onto the screen and yielding image data from the picture, the screen spaced from a front surface of the mirror array; and (3) a control system in communication with the light source and the camera, the control system operable to: (a) receive the image data from the camera; (b) determine a first color in a first zone of the image and a second color in a second zone of the image based on the image data; and (c) generate instructions to cause the light source to emit light of the first color into a first portion of the seam and to emit light of the second color into a second portion of the seam, thereby providing color in the seam to substantially match colors in the image reflected onto the pair of mirrors adjacent to the seam.

The system may further comprise a diffusor positioned between the light source and the mirror array for diffusing or blending the light emitted by the light source.

In at least one embodiment, the control system is further operable to: (d) determine a brightness or intensity of the image in the first and second zones; and (e) generate instructions to cause the light source to emit the first color of light into the first seam portion at a first intensity and to emit the second color of light into the second seam portion at a second intensity.

The system may comprise one or more of the previous embodiments and, in at least one embodiment, the light source includes one or more of: a cathode ray tube; an LED; a liquid crystal display; an organic light-emitting diode (OLED); active-matrix liquid-crystal display (AMLCD); a digital light processing (DLP) projector; a surface-conduction electron-emitter display (SED); a field-emission display (FED); a quantum dot display; a laser; and a plasma display.

The system may include any one or more of the previous embodiments and the light source can optionally emit full spectrum light including infrared light, visible light, and ultraviolet light.

The system optionally includes one or more of the previous embodiments and, in at least one embodiment, the system includes a first light source to emit infrared light, a second light source to emit visible light, and a third light source to emit ultraviolet light.

In embodiments, the system includes a plurality of light sources associated with the seam. The light source may include a plurality of individual LED lights.

The system optionally includes one or more of the previous embodiments and, in some embodiments, individual light sources of the plurality of light sources are separated by between about 0.1 mm and about 10 mm.

In some embodiments, the camera is positioned offset from the seam.

The system may include any one or more of the previous embodiments and, in at least one embodiment, the camera is oriented such that its optical axis is approximately normal to the screen.

In some embodiments, the camera is oriented toward a convex side of the screen.

Alternatively, the camera is oriented toward a concave side of the screen.

The system optionally includes one or more of the previous embodiments and, in other embodiments, the camera comprises a first camera associated with a first design eyepoint. The system further comprises a second camera associated with a second design eyepoint.

The system may include one or more of the previous embodiments and optionally the seam defines a reference plane with the first design eyepoint on a first side of the reference plane and the second design eyepoint on a second side of the reference plane. Optionally, the first camera is positioned on the second side of the reference plane and the second camera is positioned on the first side of the reference plane.

The system may include one or more of the previous embodiments and, optionally, the light source comprises a first light source to emit light through the seam toward the first user and the first design eyepoint. The system may further comprise a second light source to emit light through the seam toward the second user and the second design eyepoint.

In some embodiments, the first light source is positioned on the second side of the reference plane and the second light source is positioned on the first side of the reference plane.

The system may include any one or more of the previous embodiments, and optionally the camera is one or more of a photosensor, a photodetector, a photocell, a CCD camera, and a video camera.

In some embodiments, the camera is operable to detect a predetermined frequency or range of frequencies.

The system may include any one or more of the previous embodiments and, in some embodiments, the camera is operable to detect infrared light. Additionally, or alternatively, the camera is operable to detect visible light. In some embodiments, the camera may further be operable to detect ultraviolet light.

Optionally, the system includes one or more of the previous embodiments and, in at least one embodiment, the system is associated with a flight simulator that comprises: a flight simulation software that generates the image; and a projector for projecting the image onto the screen.

The system may include one or more of the previous embodiments and optionally the projector is positioned to project the image on a convex side of the screen.

Alternatively, the projector is positioned to project the image on a concave side of the screen.

The system may include any one or more of the previous embodiments, and optionally the control system determines the first color in the first zone of the image by one or more of: identifying an average color of the image in the first zone; and determining a count of each color of the first zone and identifying the color with a highest count.

In some embodiments, the average color in the first zone is determined using one or more of: (a) area intensity averaging; (b) running average box-car filtering; (c) finite impulse response filtering; (d) frequency-shift data replacement; and (e) individual red, green, and blue intensity modulation.

Another aspect of the present disclosure is a method of reducing the appearance of a seam in an image reflected onto a mirror array from a screen, comprising: (1) providing an active seam reduction system including a light source and a camera; (2) receiving image data from the camera, the image data related to the image displayed on the screen; (3) determining a first color in a first zone of the image associated with a first portion of the seam, the seam defined by a void between a pair of mirrors of the mirror array; (4) determining a second color in a second zone of the image associated with a second portion of the seam; (5) emitting light of the first color from the light source into the first portion of the seam; and (6) emitting light of the second color from the light source into the second portion of the seam, thereby providing color in the seam to substantially match colors in the image reflected onto the pair of mirrors adjacent to the seam.

In at least one embodiment, determining the first color in the first zone includes one or more of: identifying an average color of the image in the first zone; and determining a count of each color of the first zone and identifying the color with a highest count.

The method may include the previous embodiments and the method may further include one or more of: determining a brightness or intensity of the image in the first and second zones; and emitting the first color of light into the first seam portion at a first intensity and emitting the second color of light into the second seam portion at a second intensity.

The method may include any one or more of the previous embodiments and optionally further comprises calibrating the active seam reduction system.

The method may include any one or more of the previous embodiments, and optionally the camera is one or more of a photosensor, a photodetector, a photocell, a CCD camera, and a video camera.

In some embodiments, the camera is operable to detect a predetermined frequency or range of frequencies.

In some embodiments, the camera is operable to detect infrared light. Additionally, or alternatively, the camera is operable to detect visible light. In some embodiments, the camera may further be operable to detect ultraviolet light.

The method may include one or more of the previous embodiments and the light source can optionally emit full spectrum light including infrared light, visible light, and ultraviolet light. The method optionally includes any one or more of the previous embodiments and, in at least one embodiment, the active seam reduction system includes a first light source to emit infrared light, a second light source to emit visible light, and a third light source to emit ultraviolet light.

In some embodiments, the camera is positioned offset from the seam.

Optionally, in at least one embodiment, the camera is oriented such that its optical axis is approximately normal to the screen.

In some embodiments, the camera is oriented toward a convex side of the screen.

Alternatively, the camera is oriented toward a concave side of the screen.

The method may include one or more of the previous embodiments and optionally the active seam reduction system further comprises a diffusor positioned between the light source and the mirror array.

The method may include one or more of the previous embodiment and optionally further comprises calibrating the active seam reduction system by one or more of: (a) determining a position of a first design eyepoint of the mirror array that correlates to a position of a first user; (b) determining a second design eyepoint of the mirror array that correlates to a position of a second user; (c) identifying a first portion of the image projected onto the screen that corresponds to the first design eyepoint; (4) identifying a second portion of the image that corresponds to the second design eyepoint; and (5) positioning the camera to capture at least one of the first portion and the second portion of the image.

The method may include any one or more of the previous embodiments and may further include positioning the light source to emit light into the seam between the pair of mirrors of the mirror array.

Optionally, the method includes positioning a diffuser proximate to the light source.

The method may include any one or more of the previous embodiments and, in at least one embodiment, the camera comprises one camera positioned to capture a picture with image data that includes the first portion and the second portion of the image.

The method may further comprise calibrating an image processing algorithm to identify the first portion and the second portion of the image in the picture.

In other embodiments of the method, positioning the camera further comprises: (i) positioning a first camera to capture a first picture of the first portion of the image; and (ii) positioning a second camera to capture a second picture of the second portion of the image.

The method may include one or more of the previous embodiments and may further comprise positioning the first camera on a second side of a reference plane defined by the seam, the first design eyepoint being on a first side of the reference plane.

The method may include one or more of the previous embodiments and may further comprise positioning the second camera on the first side of the reference plane defined by the seam, the second design eyepoint being on the second side of the reference plane.

The method may include any one or more of the previous embodiments and, in at least one embodiment, the method may further comprise: (a) positioning a first light source to emit light through the seam and toward the first design eyepoint; and (b) positioning a second light source to emit light through the seam and toward the second design eyepoint.

The method may include one or more of the previous embodiments and may further comprise positioning the first light source on the second side of the reference plane defined by the seam.

The method may include one or more of the previous embodiments and may further comprise positioning the second light source on the first side of the reference plane defined by the seam.

In at least one embodiment, the method further includes: positioning a first camera proximate to the first design eyepoint, the first camera oriented toward the mirror array; and positioning a second camera proximate to the second design eyepoint, the second camera oriented toward the mirror array.

The method may further include capturing a picture of the image reflected in the mirror array by the first camera, the picture including the first portion of the image and light emitted by the light source through the seam. Optionally, the method further comprises comparing light in the picture associated with the first portion of the image to the light emitted through the seam by the light source.

The method may include any one or more of the previous embodiments and may further comprise: (i) determining a brightness of the first color and a brightness of the second color; (ii) emitting the first color of light into the first seam portion at a first intensity; and (iii) emitting the second color of light into the second seam portion at a second intensity.

In some embodiments, the method can include one or more of the previous embodiments and further comprises: determining a first frequency of light in the first zone and a second frequency of light in the second zone; emitting light of the first frequency into the first seam portion; and emitting light of the second frequency into the second seam portion.

It is another aspect of the present disclosure to provide a system for reducing the appearance of a seam in an image reflected onto a mirror array from a screen. The system generally includes: (1) a processor; and (2) a memory storing instructions for execution by the processor that, when executed, cause the processor to: (a) receive image data from a camera related to the image projected onto the screen; (b) determine a first color in a first zone of the image associated with a first portion of the seam, the seam defined by a void between a pair of mirrors of the mirror array; (c) determine a second color in a second zone of the image associated with a second portion of the seam; (d) cause a light source to emit light of the first color into the first portion of the seam; and (e) cause the light source to emit light of the second color into the second portion of the seam, thereby providing color in the seam to substantially match colors in the image reflected onto the pair of mirrors adjacent to the seam.

In at least one embodiment, determining the first color in the first zone includes one or more of: identifying an average color of the image in the first zone; and determining a count of each color of the first zone and identifying the color with a highest count.

In other embodiments, the instructions cause the processor to: determine a brightness or intensity of the image in the first and second zones; cause the light source to emit the first color of light into the first portion of the seam at a first intensity; and cause the light source to emit the second color of light into the second portion of the seam at a second intensity.

Optionally, receiving image data comprises receiving first image data from a first camera associated with a first user at a first design eye point and receiving second image data from a second camera associated with a second user at a second design eye point. The instructions may then cause the processor to determine a first color in the first zone of the image associated with the first portion of the seam from the perspective of the first camera. Additionally, or alternatively, the instructions may cause the processor to determine a second color in a first zone of the image associated with a first portion of the seam from the perspective of the second camera.

In one at least embodiment, the light source comprises a first light source to emit light through the seam toward the first user and a second light source to emit light through the seam toward the second user. The instructions may cause the processor to: (i) cause the first light source to emit light of the first color into the first portion of the seam, the light emitted from the first light source being oriented toward the first user; and (ii) cause the second light source to emit light of the second color into the first portion of the seam, the light emitted from the second light source being oriented toward the second user.

Still another aspect of the disclosure is a flight simulator for training a user to operate an aircraft, comprising: (1) a display system to simulate a view out of a window of the aircraft, comprising: (a) a screen; (b) a projector operable to generate an image that is displayed on the screen; and (c) a mirror array to reflect the image to a design eye point of the simulator, the mirror array including a first mirror, a second mirror adjacent to the first mirror, and a seam between the first and second mirrors; and (2) an active seam reduction system, comprising (a) a light source to emit light into the seam; and (b) a camera oriented toward the screen to collect data on the image displayed on the screen.

In some embodiments, the flight simulator optionally comprises a control system in communication with the light source and the camera, the control system operable to: (i) receive data from the camera; (ii) determine a first color in a first zone of the image and a second color in a second zone of the image based on the data from the camera; and (iii) generate instructions to cause the light source to emit light of the first color into a first portion of the seam and to emit light of the second color into a second portion of the seam, thereby providing colors in the seam to substantially match colors in the image reflected onto the pair of mirrors adjacent to the seam.

In at least one embodiment, the control system is further operable to: (i) determine a brightness or intensity of the image in the first and second zones; (ii) generate an instruction to cause the light source to emit the first color of light into the first seam portion at a first intensity; and (iii)

generate an instruction to cause the light source to emit the second color of light into the second seam portion at a second intensity.

The flight simulator may include any one or more of the previous embodiments and optionally the control system determines the first color in the first zone of the image by one or more of: (i) identifying an average color of the image in the first zone; and (ii) determining a count of each color of the first zone and identifying the color with a highest count.

In some embodiments, the flight simulator can include one or more of the previous embodiments and optionally the control system is further operable to: determine a first frequency of light in the first zone and a second frequency of light in the second zone; generate an instruction for the light source to emit light of the first frequency into the first seam portion; and generate an instruction for the light source to emit light of the second frequency into the second seam portion.

The flight simulator may include one or more of the previous embodiments and may further include a flight simulation software (or an image generator) that generates the image.

In some embodiments, the average color in the first zone is determined using one or more of: (a) area intensity averaging; (b) running average box-car filtering; (c) finite impulse response filtering; (d) frequency-shift data replacement; and (e) individual red, green, and blue intensity modulation.

The flight simulator may include one or more of the previous embodiments and optionally the projector is positioned to project the image on a convex side of the screen.

Alternatively, the projector is positioned to project the image on a concave side of the screen.

The flight simulator may include any one or more of the previous embodiments and optionally further comprises a diffusor positioned between the light source and the mirror array for diffusing or blending the light emitted by the light source.

The flight simulator may comprise one or more of the previous embodiments and, in at least one embodiment, the light source includes one or more of: a cathode ray tube; an LED; a liquid crystal display; an organic light-emitting diode (OLED); active-matrix liquid-crystal display (AMLCD); a digital light processing (DLP) projector; a surface-conduction electron-emitter display (SED); a field-emission display (FED); a quantum dot display; a laser; and a plasma display.

The flight simulator may include any one or more of the previous embodiments and the light source can optionally emit full spectrum light including infrared light, visible light, and ultraviolet light.

The flight simulator optionally includes one or more of the previous embodiments and, in at least one embodiment, the active seam reduction system includes a first light source to emit infrared light, a second light source to emit visible light, and a third light source to emit ultraviolet light.

In embodiments, the active seam reduction system includes a plurality of light sources associated with the seam. The light sources may include a plurality of individual LED lights.

The flight simulator optionally includes one or more of the previous embodiments and, in some embodiments, individual light sources of the plurality of light sources are separated by between about 0.1 mm and about 10 mm.

In some embodiments, the camera is positioned offset from the seam.

The flight simulator may include any one or more of the previous embodiments and, in at least one embodiment, the camera is oriented such that its optical axis is approximately normal to the screen.

In some embodiments, the camera is oriented toward a convex side of the screen.

Alternatively, the camera is oriented toward a concave side of the screen.

The flight simulator optionally includes one or more of the previous embodiments and, in other embodiments, the camera comprises a first camera associated with a first design eyepoint of the flight simulator and the active seam reduction system further comprises a second camera associated with a second design eyepoint of the flight simulator.

The flight simulator may include one or more of the previous embodiments and optionally the seam defines a reference plane with the first design eyepoint on a first side of the reference plane and the second design eyepoint on a second side of the reference plane. Optionally, the first camera is positioned on the second side of the reference plane and the second camera is positioned on the first side of the reference plane.

The flight simulator may include one or more of the previous embodiments and, optionally, the light source comprises a first light source to emit light through the seam toward a first user at the first design eyepoint. The flight simulator may further comprise a second light source to emit light through the seam toward a second user at the second design eyepoint.

In some embodiments, the first light source is positioned on the second side of the reference plane and the second light source is positioned on the first side of the reference plane.

The flight simulator may include any one or more of the previous embodiments, and optionally the camera is one or more of a photosensor, a photodetector, a photocell, a CCD camera, and a video camera.

In some embodiments, the camera of the active seam reduction system is operable to detect a predetermined frequency or range of frequencies.

The flight simulator may include any one or more of the previous embodiments and, in some embodiments, the camera is operable to detect infrared light. Additionally, or alternatively, the camera is operable to detect visible light. In some embodiments, the camera may further be operable to detect ultraviolet light.

The Summary is neither intended nor should it be construed as being representative of the full extent and scope of the present disclosure. The present disclosure is set forth in various levels of detail in the Summary as well as in the attached drawings and the Detailed Description and no limitation as to the scope of the present disclosure is intended by either the inclusion or non-inclusion of elements, components, etc. in this Summary. Additional aspects of the present disclosure will become more clear from the Detailed Description, particularly when taken together with the drawings.

The phrases "at least one," "one or more," and "and/or," as used herein, are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity, as used herein, refers to one or more of that entity. As such, the terms "a" (or "an"), "one or more" and "at least one" can be used interchangeably herein. Unless otherwise indicated, all numbers expressing quantities, dimensions, conditions, ratios, ranges, and so forth used in the specification and claims are to be understood as being modified in all instances by the term "about" or "approximately". Accordingly, unless otherwise indicated, all numbers expressing quantities, dimensions, conditions, ratios, ranges, and so forth used in the specification and claims may be increased or decreased by approximately 5% to achieve satisfactory results. Additionally, where the meaning of the terms "about" or "approximately" as used herein would not otherwise be apparent to one of ordinary skill in the art, the terms "about" and "approximately" should be interpreted as meaning within plus or minus 5% of the stated value.

All ranges described herein may be reduced to any sub-range or portion of the range, or to any value within the range without deviating from the invention. For example, the range "5 to 55" includes, but is not limited to, the sub-ranges "5 to 20" as well as "17 to 54."

The use of "including," "comprising," or "having" and variations thereof herein is meant to encompass the items listed thereafter and equivalents thereof as well as additional items. Accordingly, the terms "including," "comprising," or "having" and variations thereof can be used interchangeably herein.

It shall be understood that the term "means" as used herein shall be given its broadest possible interpretation in accordance with 35 U.S.C., Section 112(f). Accordingly, a claim incorporating the term "means" shall cover all structures, materials, or acts set forth herein, and all of the equivalents thereof. Further, the structures, materials, or acts and the equivalents thereof shall include all those described in the Summary, Brief Description of the Drawings, Detailed Description, Abstract, and Claims themselves.

BRIEF DESCRIPTION OF THE DRAWINGS

The accompanying drawings, which are incorporated in and constitute a part of the specification, illustrate embodiments of the disclosed system and together with the general description of the disclosure given above and the detailed description of the drawings given below, serve to explain the principles of the disclosed system(s) and device(s).

Figure 1A:
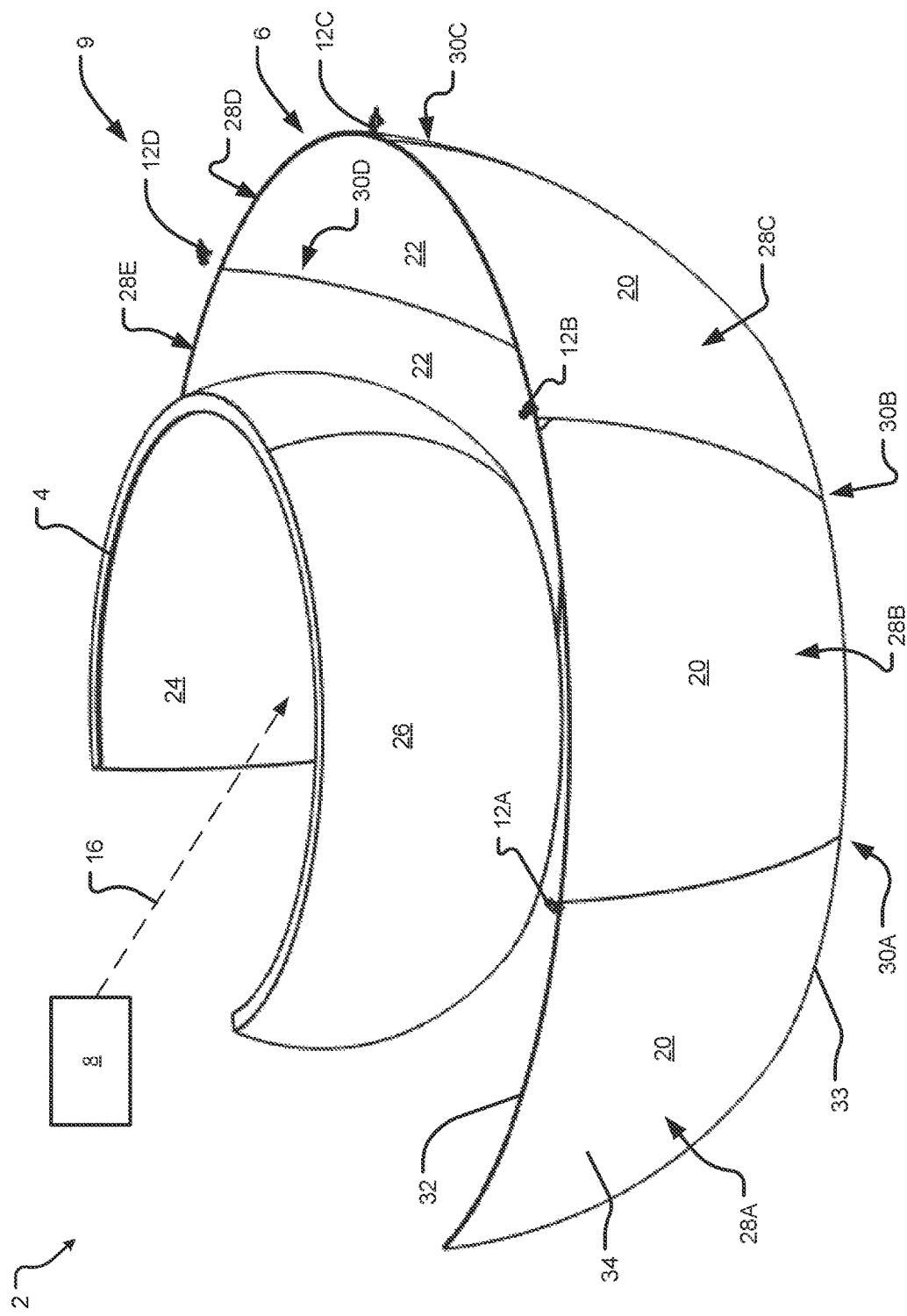
FIG. 1A is an isometric view of a simulator with an active seam reduction system according to at least one embodiment of the present disclosure.

The drawings are not necessarily (but may be) to scale. In certain instances, details that are not necessary for an understanding of the disclosure or that render other details difficult to perceive may have been omitted. It should be understood, of course, that the disclosure is not necessarily limited to the embodiments illustrated herein. As will be appreciated, other embodiments are possible using, alone or in combination, one or more of the features set forth above or described below. For example, it is contemplated that various features and devices shown and/or described with respect to one embodiment may be combined with or substituted for features or devices of other embodiments regardless of whether or not such a combination or substitution is specifically shown or described herein.

The following is a listing of components according to various embodiments of the present disclosure, and as shown in the drawings:

| Number | Component |
| --- | --- |
| 2 | Simulator |
| 4 | Screen |
| 6 | Mirror Array |
| 8 | Projector |
| 9 | Active Seam Reduction System |
| 10 | Light Source |
| 12A-D | Cameras |
| 14 | Control System |
| 16 | Image |
| 17 | Image Zones |
| 17A | First Zone |
| 17B | Second Zone |
| 17C | Third Zone |
| 18 | User |
| 18A | First User |
| 18B | Second User |
| 20 | Rear Surface (of the Mirror Array) |
| 22 | Front Surface (of the Mirror Array) |
| 24 | Concave Side (of the Screen) |
| 26 | Convex Side (of the Screen) |
| 28A-E | Mirrors |
| 30A-D | Seams |
| 32 | Top (of the Mirror Array) |
| 33 | Bottom (of the Mirror Array) |
| 34 | Side (of the Mirror Array) |
| 36 | Diffusor |
| 38 | Collimated light rays of image |
| 40-1 | First Design Eyepoint |
| 40-2 | Second Design Eyepoint |
| 41-1 | First Camera |
| 41-2 | Second Camera |
| 42-1 | First Portion (of the Image) |
| 42-2 | Second Portion (of the Image) |
| 44-1 | First Viewpoint |
| 44-2 | Second Viewpoint |
| 48 | One or More Portions (of the Seam) |
| 48A | First seam portion |
| 48B | Second seam portion |
| 48C | Third seam portion |

-continued

| Number | Component |
|---|---|
| 50 | Processor |
| 52 | Memory |
| 54 | Communication Interface |
| 56 | User Interface |
| 58 | Controller |
| 60 | Image Processing Algorithm |
| 62 | Color Determination Algorithm |
| 64 | Controller Instructions |
| 66 | Method of reducing the appearance of a seam |
| 68 | Step 68 (of Method 66) |
| 70 | Step 70 (of Method 66) |
| 72 | Step 72 (of Method 66) |
| 74 | Step 74 (of Method 66) |
| 76 | Step 76 (of Method 66) |
| 78 | Method of calibrating a system |
| 80 | Step 80 (of Method 78) |
| 82 | Step 82 (of Method 78) |
| 84 | Step 84 (of Method 78) |
| 86 | Step 86 (of Method 78) |

DETAILED DESCRIPTION

Referring now to FIGS. 1A-5, an active seam reduction system 9 for a simulator 2 according to embodiments of the present disclosure is generally illustrated. The system 9 is configured to reduce an appearance of a seam in the simulator 2, so as to provide a realistic, seamless image to a user. The simulator 2 generally includes a screen 4, a mirror array 6 opposite the screen 4, and a projector 8. In some embodiments, the simulator 2 may include more components or less components. For example, in embodiments where the screen 4 is self-illuminating, the simulator 2 may not include the projector 8.

Figure 3:
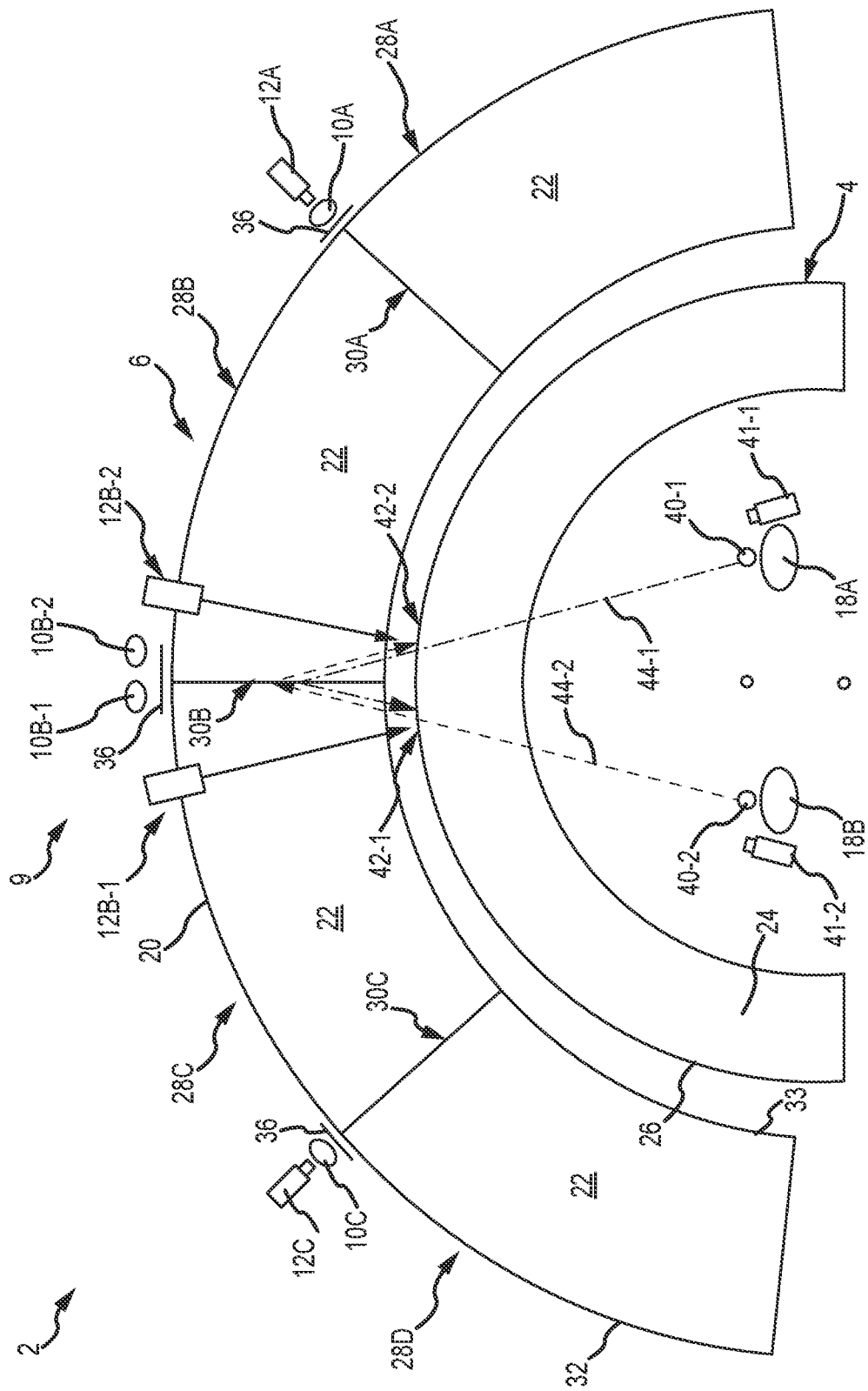
FIG. 3 is a schematic top plan view of an active seam reduction system for a simulator according to at least one embodiment of the present disclosure.

The mirror array 6 includes at least two mirrors 28 with a gap or seam 30 between adjacent mirrors. In some embodiments, as shown in FIG. 1A, the mirror array 6 includes five mirrors 28A, 28B, 28C, 28D, 28E and four seams 30A, 30B, 30C, 30D. However, in other embodiments, such as illustrated in FIG. 3, the active seam reduction system 9 is associated with a simulator 2 with a mirror array 6 including four mirrors 28A-28D and three seams 30A-30C. In still other embodiments, it will be appreciated that the mirror array 6 may include two mirrors 28 or more than two mirrors 28.

The active seam reduction system 9 of the present disclosure is configured to reduce the appearance of the seam 30 in an image 16 reflected onto the mirror array 6 as viewed by a user. The system 9 generally includes a light source 10, a camera 12 (e.g., 12A, 12B, 12C, 12D), and a control system 14 (shown in FIGS. 2A-2C and 5). In some embodiments, the system 9 may include fewer or more components than illustrated. Further, it will be appreciated that the light source 10, the camera 12, and the control system 14 are independent of the projector 8 and an image 16 displayed by the projector 8.

Figure 1B:
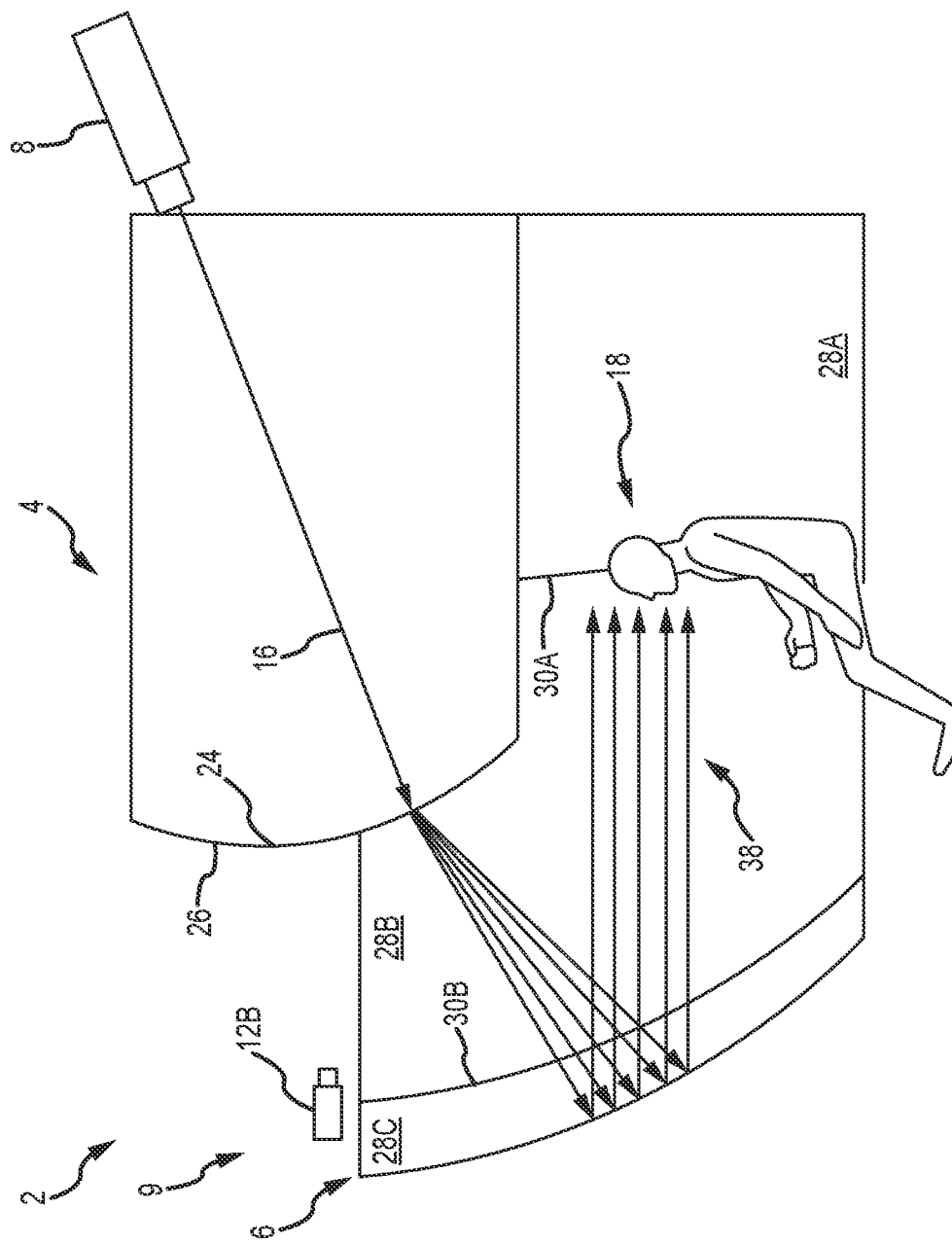
FIG. 1B is a schematic cross-sectional side elevation view of the system shown in FIG. 1A.

During use, the projector 8 projects the image 16 onto the screen 4 and the image 16 is viewed by a user 18 as a reflection in the mirror array 6. As shown in FIG. 1B, the image 16 is visible to a user 18 as collimated light rays 38 and seen at a distant focus without distortion to the image 16. The collimated light rays 38 are substantially parallel to each other. This is achieved by the image 16 being projected onto the screen 4 by the projector 8, with the image 16 then being reflected in the mirror array 6 and viewed by the user 18. It will be appreciated that in some embodiments, the screen 4 may be self-illuminating and may display the image 16 without the projector 8, as will be describe in more detail herein.

When used with a flight simulator 2, the image 16 visible to the user 18 may depict an environment outside of a cockpit of an airplane or helicopter. The flight simulator 2 may comprise a flight simulation software that generates the image 16. Although the system 9 is described with respect to a flight simulator 2, it will be appreciated that the system 9 can be used with any type of simulator, for example, simulators for mobile equipment and vehicles of all sizes and types including cars, trucks, trains, tracked vehicles (such as tanks or construction vehicles), ships, and spacecraft. The system 9 may also be used with games or other systems that include a mirror array 6 with seams 30.

Figure 2A:
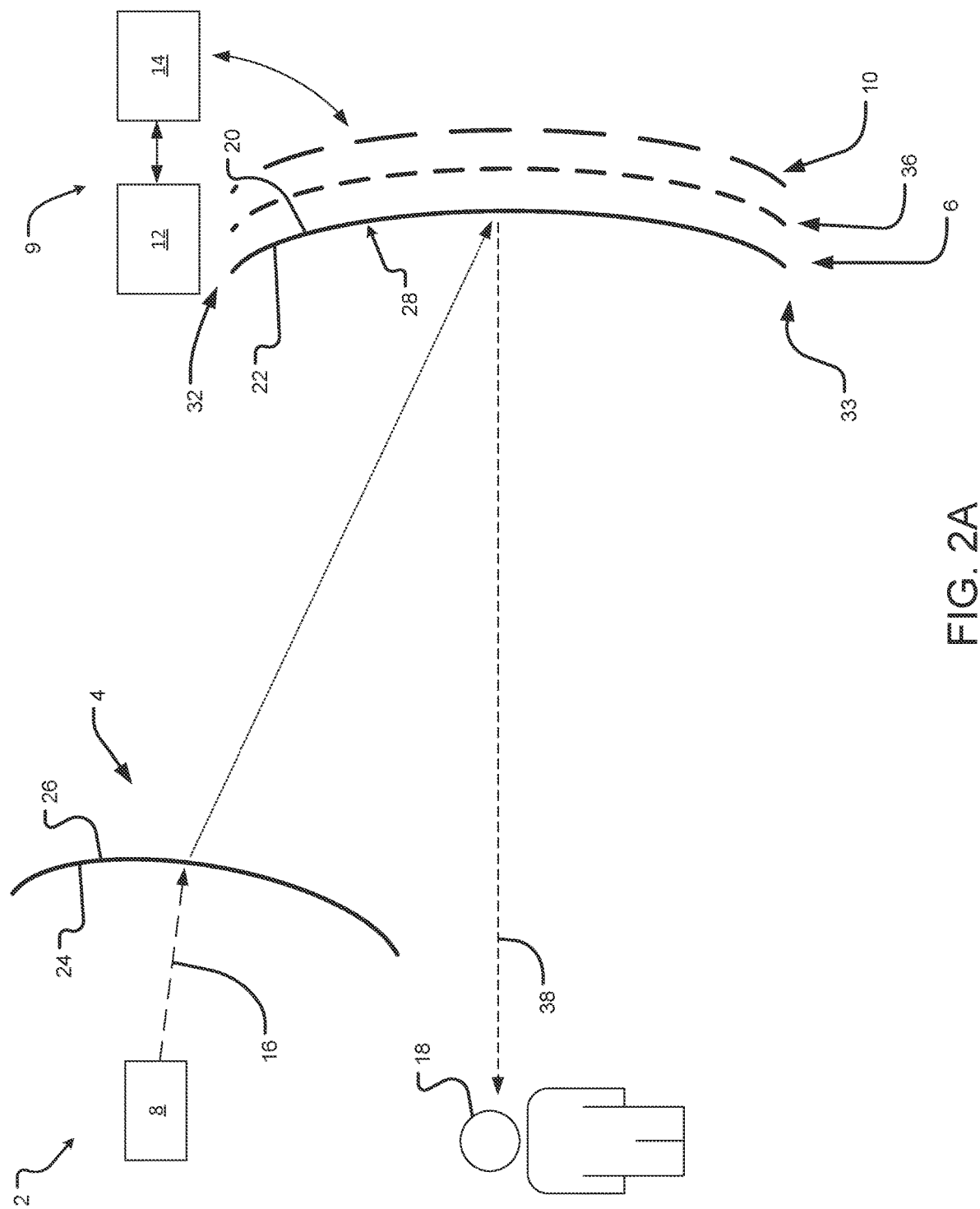
FIG. 2A is a schematic side elevation view of an active seam reduction system for a simulator according to at least one embodiment of the present disclosure.
Figure 2B:
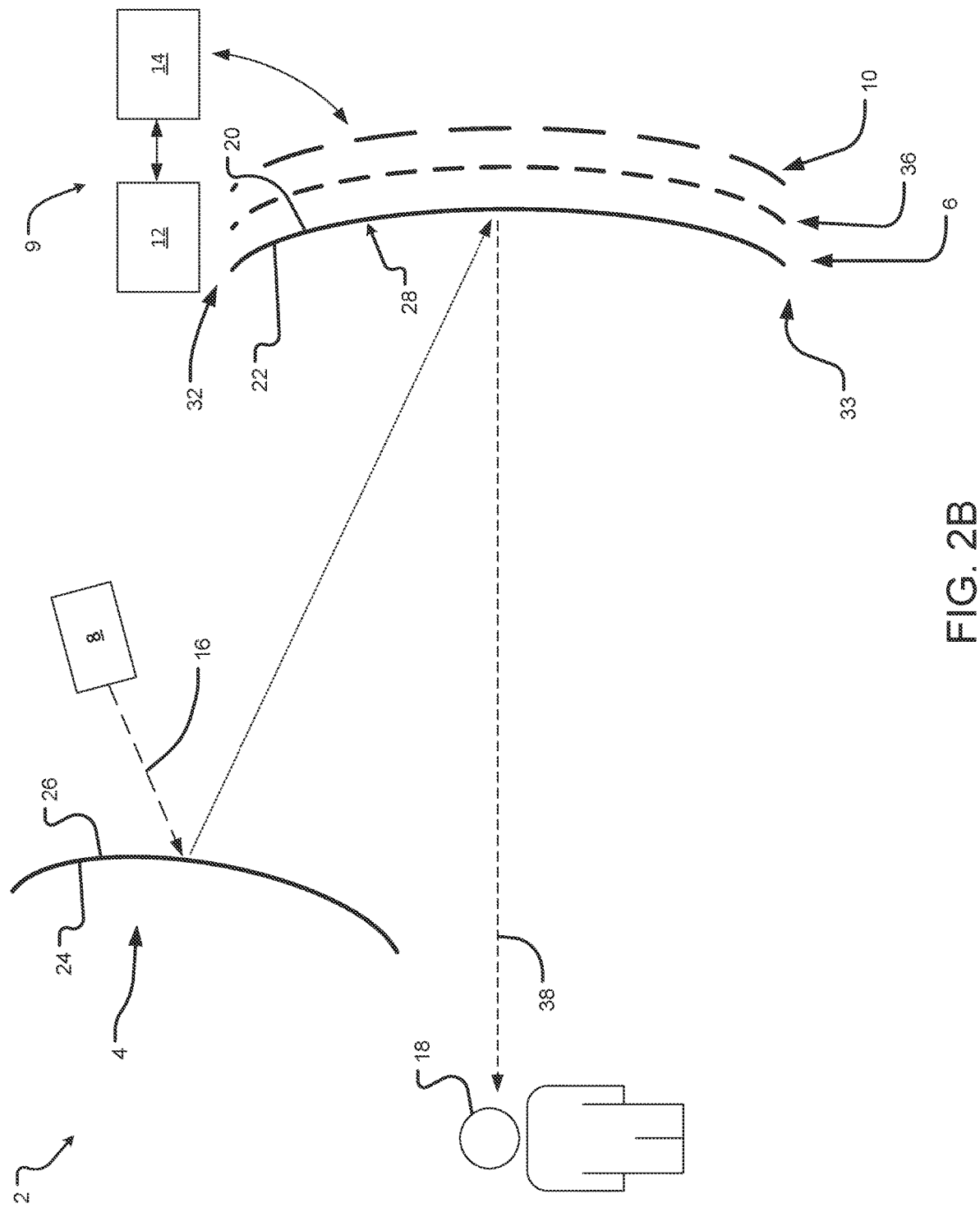
FIG. 2B is a schematic side elevation view of an active seam reduction system for a simulator according to other embodiments of the present disclosure.
Figure 2C:
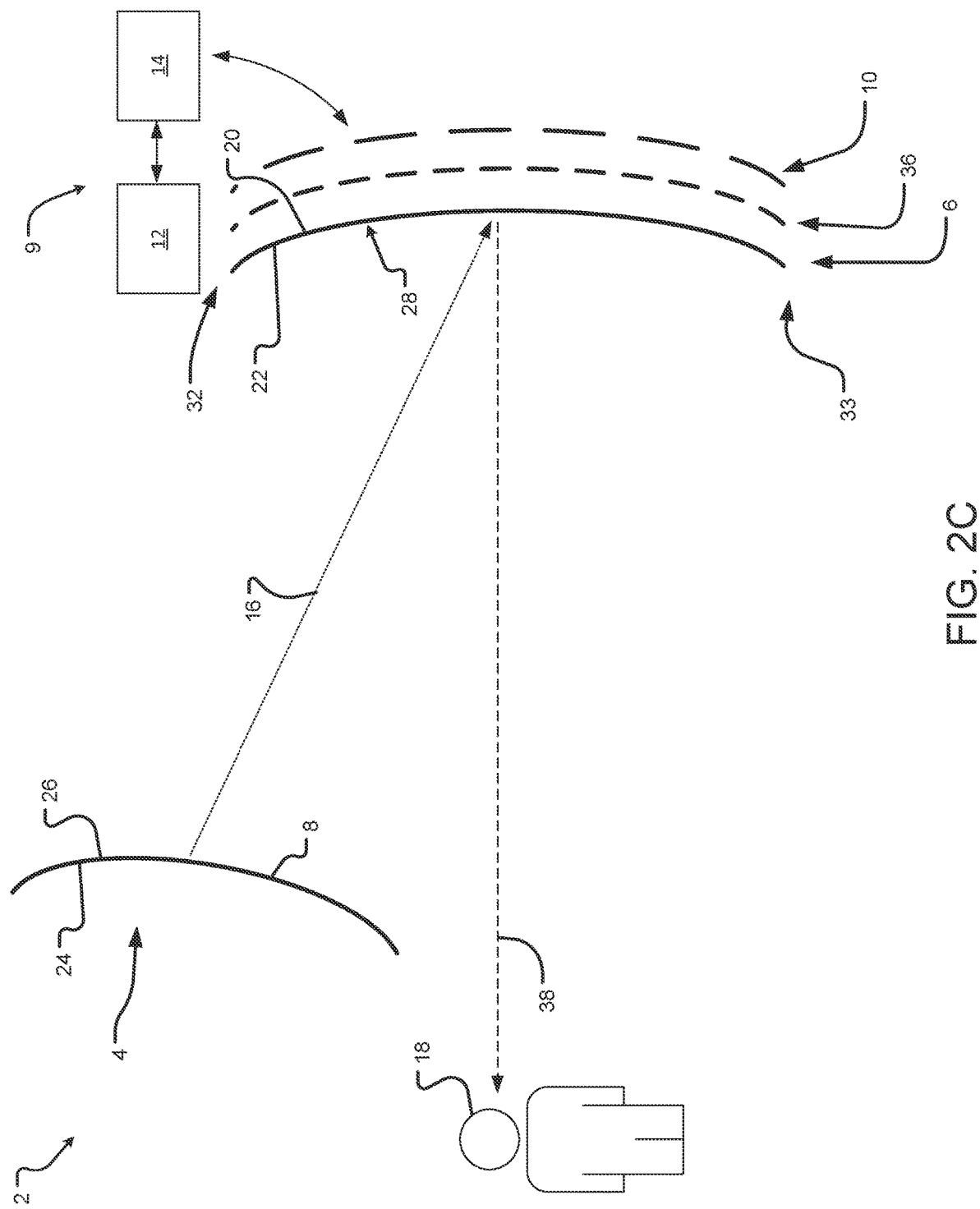
FIG. 2C is a schematic side elevation view of an active seam reduction system for a simulator according to still other embodiments of the present disclosure.

Turning to FIGS. 2A-2C, different embodiments of simulators 2 with different arrangements of projectors 8 for projecting an image 16 onto the mirror array 6 are shown. Generally, each mirror 28 of the mirror array 6 of the simulator 2 includes a rear surface 20 opposite a front surface 22. The front surface 22 is operable to reflect an image 16 from the screen 4 that is then visible to the user 18. In this manner, the user 18 views the image 16 using the reflective front surface 22 of the mirrors 28 of the mirror array 6. In some embodiments, the image 16 is formed on the screen 4 by a projector 8. In other embodiments, the screen 4 is self-illuminated.

Each mirror 28 of the mirror array 6 may be curved or flat. The mirror array 6 may include a combination of curved and/or flat mirrors 28. In some embodiments, for example, as shown in FIG. 3, the mirror array 6 may include four mirrors 28 (e.g., 28A, 28B, 28C, 28D). In other embodiments, for example, the mirror array 6 may include more than two mirrors 28 (e.g., 28A, 28B, 28C, 28D, 28E). For a mirror having a curve, in at least one embodiment, the mirror has a radius of curvature between about 9 feet and about 12 feet. Optionally, the radius of curvature of the mirror is about 9.25 feet, about 10 feet, or about 11 feet. In other embodiments, the radius of curvature may be less than 9 feet or greater than 12 feet.

The screen 4 may be curved or flat. In some embodiments, the screen 4 is formed of a clear or substantially transparent material. For example, the screen 4 may be acrylic or may be glass. In some embodiments, the screen 4 is treated to diffuse light from the projector 8. In some embodiments the screen 4 includes a diffusion coating or film. The screen 4 includes a concave side 24 opposite a convex side 26 and is operable to display an image 16 on the concave side 24 and/or the convex side 26. In some embodiments, a film or coating is applied to the convex side 26 to enable the image 16 to be focused onto the screen 4.

In some embodiments, as generally shown in FIG. 2A, an image 16 is back-projected onto the concave side 24 of the screen 4 by the projector 8. The projector 8 is positioned facing the concave side 24 of the screen. In such embodiments, the image 16 is also visible on the convex side 26, which is then reflected onto the mirror array 6. In at least one embodiment such as the illustrated embodiment, the convex side 26 of the screen 4 has a diffusion coating or is treated to diffuse light from the projector 8.

In other embodiments, shown in FIG. 2B, an image 16 is front-projected onto the convex side 26 of the screen 4 by a projector 8 positioned facing the convex side 26. The image 16 is then reflected onto the mirror array 6. In such embodiments, the screen 4 may be formed of an opaque material, such as fiberglass.

In still other embodiments, shown in FIG. 2C, the screen 4 includes elements of the projector 8. In this manner, the screen 4 is self-illuminating. Accordingly, the screen 4 projects the image 16 from (or onto) the convex side 26 of the screen 4. The image 16 is then reflected onto the mirror array 6. Any suitable self-illuminating screen 4 known to those of skill in the art may be used with the active seam reduction system 9 of the present disclosure. In such self-projected or self-illuminating embodiments, the screen 4 may be at least one of, but not limited to, a self-illuminating curved screen, a set of LED panels, or an organic light emitting diodes (OLED) screen.

It will be understood by one skilled in the art that any arrangement of the projector 8, the screen 4, and one or more mirror arrays 6 are within the scope of the present disclosure. In some embodiments, the active seam reduction system 9 can be used with a simulator 2 having screens 4 and mirror arrays 6 with different configurations and arrangements. For example, a curved screen 4 may be used with a flat mirror array 6, a curved mirror array 6 may be used with a flat screen 4, and/or a curved mirror array 6 may be used with a curved screen 4. In at least one embodiment, the screen 4 and the mirror 28 are generally concave and curved in two or more dimensions.

Turning to FIG. 3, in the illustrated embodiments the mirror array 6 comprises four mirrors 28A, 28B, 28C, 28D having seams 30A, 30B, 30C defined by a void between adjacent mirrors. It will be appreciated that in other embodiments the mirror array 6 may have more than four mirrors 28 and more than three corresponding seams 30. In the illustrated examples, the seam 30 is vertical as viewed by a user 18. In other embodiments, the seam 30 may be horizontal or angled. In further embodiments with two or more seams 30, each seam 30 may be sized and/or oriented differently from each other or may be the same size and/or orientation as each other.

As shown in FIG. 3, at least one light source 10A-10C is configured to emit light into a corresponding seam 30A-30C. In some embodiments, the light source 10 is positioned proximate to the rear surface 20 of the mirror array 6 (e.g., positioned behind the seam 30). In other embodiments, the light source 10 may be positioned in the seam 30, adjacent to the seam 30, angled to the seam 30, or any other position. The light source 10 may be adapted to emit light in a predetermined direction. More specifically, the light source 10 may be positioned or oriented to emitted light into the seam 30 toward one or more users 18. Additionally, or alternatively, a mask or filter may be associated with the light source 10 to limit emission of light to the predetermined direction. Optionally, a lens may be associated with the light source 10. For example, the lens may be a UV filer, a polarizing filter, or a clear filter.

Figure 5:
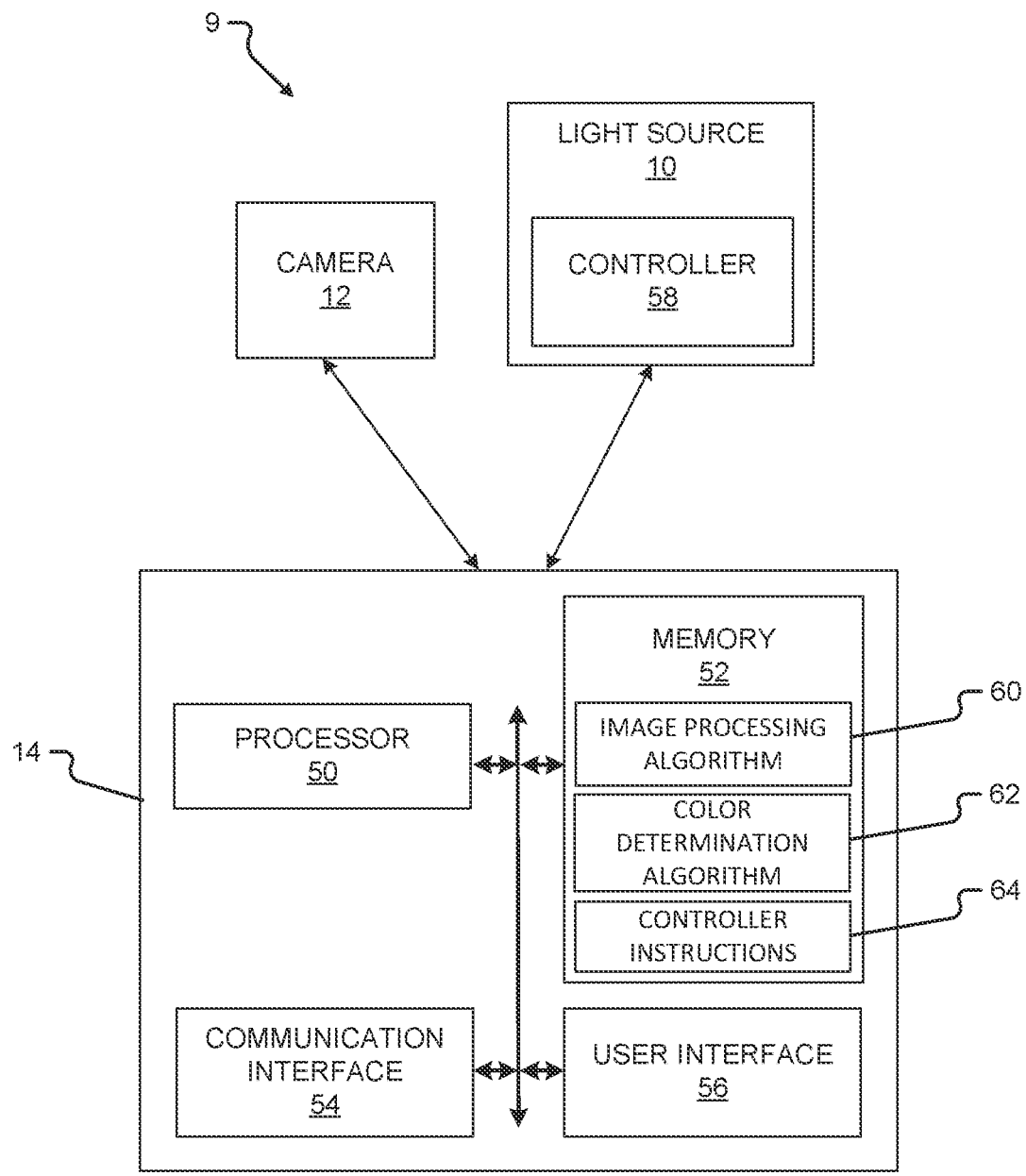
FIG. 5 is a schematic diagram of a control system of an active seam reduction system according to at least one embodiment of the present disclosure.

In some embodiments, as described with respect to FIG. 5, the light source 10 may be automatically controlled by a controller 58 to emit light of a predetermined color (or wavelength) and intensity. In other embodiments, the light source 10 may be manually controlled by the user or an operator via the control system 14. The light source 10 includes, but is not limited to, one or more of: a cathode ray tube; an LED; a liquid crystal display; an organic light-emitting diode (OLED); active-matrix liquid-crystal display (AMLCD); a digital light processing (DLP) projector; a surface-conduction electron-emitter display (SED); a field-emission display (FED); a quantum dot display; a laser; and a plasma display. In at least one embodiment, the light source 10 is operable to emit full spectrum light including infrared light, visible light, and/or ultraviolet light of any frequency. For example, the light source 10 may emit infrared light for use with night vision goggles. During use, the light source 10 emits light into the seam 30 to blend the image 16 reflected on the pair of mirrors 28 adjacent to the seam 30, thereby producing a seamless image 16 as viewed from the perspective of the user 18.

In embodiments where more than one user 18 is present, the system 9 may include a light source 10 for each user associated with at least one seam 30. For example, as generally illustrated in FIG. 3, two lights sources 10B-1 and 10B-2 are associated with a center seam 30B between mirrors 28B, 28C. The light sources 10B are each associated with one of the two users 18A, 18B. More specifically, light source 10B-1 is positioned to emit light into the center seam 30B based on image data collected by camera 12B-1. In this manner, the light source 10B-1 reduces the appearance of the center seam 30B in the image 16 as viewed by the first user 18A. Similarly, light source 10B-2 is positioned to emit light into the center seam 30B to match the light collected by camera 12B-2 to reduce the appearance of the center seam 30B in the image 16 as viewed from the perspective of the second user 18B.

Although the other seams 30A, 30C of the simulator 2 illustrated in FIG. 3 are shown with only one light source 10, it will be appreciated by one of skill in the art that the system 9 of the current disclosure may optionally have two light sources 10 in each of the seams 30A, 30C. It will also be appreciated that each seam 30 may include more than two light sources 10 in some embodiments.

The camera 12 is configured and operable to take a picture of the image 16 displayed on the screen 4 and yield image data from the picture. The camera 12 is any type of sensor operable to collect data on the image 16 displayed on the screen 4. Any suitable camera 12 known to those of skill in the art can be used with the system 9 of the present disclosure. For example, the camera 12 may be one or more of a photosensor, a photodetector, a photocell, a CCD camera, and a video camera. In at least one embodiment, the camera 12 is operable to detect infrared light, visible light, and/or ultraviolet light of any predetermined frequency or range of frequencies.

In all embodiments, the camera 12 is positioned to capture an image 16 displayed on the screen 4. In some embodiments, the camera may face the convex side 26 of the screen. Alternatively, the camera 12 may be positioned to face the concave side 24 of the screen 4.

As shown in FIG. 3, in at least one embodiment the camera 12 is positioned near a top 32 of the mirror array 6 and faces the convex side 26 of the screen 4. The camera may optionally be positioned near a bottom 33 of the mirror array. In embodiments where the camera is positioned at or near the top 32 of the mirror array 6, the camera 12 may be positioned proximate to the seam 30, such as above a centerline of the seam 30.

Optionally, the camera may be positioned such that its optical axis is approximately parallel to a plane defined by the seam. For example, the camera may be oriented with its optical axis coplanar with the plane defined by the seam.

In some embodiments, the camera 12 is positioned offset to the seam 30 and positioned to capture a portion of the image 16 as viewed by the user(s) 18, as discussed in more detail herein. More specifically, the camera 12 may be positioned such that its optical axis is offset from a plane defined by the seam 30.

In at least one embodiment, the camera 12 is oriented such that its optical axis is approximately normal to the screen 4.

Alternatively, in other embodiments, the optical axis of the camera is not normal to the screen.

The system 9 may include any number of cameras 12. In some embodiments, the system 9 includes at least one camera 12 associated with each seam 30 as generally illustrated in FIG. 1. Optionally, the system 9 can include two or more cameras associated with at least one seam 30, as shown in FIG. 3. For example, in some embodiments, such as when the simulator 2 is configured for multiple users, one or more of the seams may have a camera 12 associated with each user. The cameras 12 may be in communication with the control system 14, as shown in FIGS. 2A-C and 3 and described in detail with respect to FIG. 5.

During use, a field of view of the camera 12 may be adjusted to collect image data approximately equal to a size of the seam 30. In embodiments with more than one user, the field of view of the camera 12 may be adjusted to collect image data for each user. Such adjustment may be performed via software configured to limit the image data received from the camera 12 and/or to limit the image data collected and/or analyzed. The camera 12 may also be adjusted manually by filters or masks. The adjustment advantageously limits an amount of image processing and image data analysis required, thereby reducing the time needed for image and/or data processing.

Referring again to FIG. 3, the positions and orientation of the cameras 12 and/or calibration of an image software may correlate or depend on a position of one or more users 18. For example, in some embodiments the simulator 2 includes a first design eyepoint 40-1 and a second design eyepoint 40-2, illustrated as spheres. The design eyepoints 40-1 and 40-2 represent positions of a first user 18A and a second user 18B. In other embodiments, there may be more than two users. In some embodiments, the first user 18A is a pilot and the second user 18B is a co-pilot.

A first viewpoint 44-1 corresponding to the first design eyepoint 40-1 and a second viewpoint 44-2 associated with the second design eyepoint 40-2 are depicted as dashed lines and illustrate both users 18 looking toward a center seam 30B of the mirror array 6. The first and second viewpoints 44-1, 44-2 represent the viewpoints of the first user 18A and the second user 18B as they would view the image 16 reflected onto the mirror array 6. As shown, the viewpoints 44-1 and 44-2 are different for each of the two users when the two users 18A, 18B are looking at the center seam 30B, and the users 18A, 18B see two different parts of the image 16 from the screen 4 in the mirror array 6.

More specifically, for the first user 18A, which may be, for example, a pilot, positioned in a right seat of the simulator 2, the center seam 30B is inboard (or positioned to the left) of the pilot 18A. In contrast, for the second user 18B, which may be, for example, a copilot, positioned in a left seat of the simulator 2, the center seam 30B is positioned to the right. The first user 18A may also be described as being positioned on a first side of a reference plane defined by the center seam 30B. The second user 18B may be describe as being positioned on a second side of the reference plane.

With respect to the viewpoints 44 of the first and second users 18A, 18B, the first viewpoint 44-1 of the first user 18A (e.g., a pilot) views a first portion 42-1 of the image 16 to a left of the seam 30B (or on the second side of the reference plane defined by the seam 30B). In contrast, the second viewpoint 44-2 of the second user 18B (e.g., a copilot) views a second portion 42-2 of the image 16 to a right of the seam 30B (or on the first side of the reference plane).

In some embodiments, identifying the first portion 42-1 and the second portion 42-2 is performed manually by a user. In other embodiments, the first portion 42-1 and the second portion 42-2 are automatically identified by a first camera 41-1 positioned at the first design eyepoint 40-1 and a second camera 41-2 positioned at the second design eyepoint 40-2. The first camera 41-1 and the second camera 41-2 may be configured to automatically capture and identify the first portion 41-1 and the second portion 42-2 as seen from the first design eyepoint 40-1 (e.g., the pilot or co-pilot) and the second design eyepoint 40-2 (e.g., the pilot or co-pilot), respectively. It will be appreciated that in embodiments with one viewpoint or more than two viewpoints, the system 9 may include a respective camera for each viewpoint. It will also be appreciated that a single camera can be calibrated to capture multiple viewpoints.

As such, a first camera 12B-1 associated with the center seam 30B and the first user 18A (and the first design eyepoint 40-1) may be configured to capture the first portion 42-1 of the image 16. To do this, the first camera 12B-1 is positioned to the left of the center seam 30B in the perspective of FIG. 3 (for example, on the second side of the reference plane defined by the center seam 30B). Similarly, a second camera 12B-2 associated with the center seam 30B and the second user 18B may be configured to capture the second portion 42-2 of the image 16. The second camera 12B-2 is positioned to the right of the center seam 30B (or the first side of the reference plane).

In other embodiments, a single camera 12 is used to capture both the first portion 42-1 and the second portion 42-2 of the image 16. An image processing algorithm 60 may be calibrated to identify the first portion 42-1 and the second portion 42-2 of the captured image received from the single camera 12. In further other embodiments, the image processing algorithm 60 may be calibrated to identify a single viewpoint or otherwise combine the viewpoints. For example, the viewpoint may be a position between the first user or pilot 18A and the second user or copilot 18B. Such single viewpoint or combined viewpoint may be used to position and orient the camera 12 and/or calibrate the image processing algorithm 60.

Further, in embodiments with two users such as the first and second users 18A, 18B and as previously described, the light source 10 may include a light source 10B-1, 10B-2 associated with each user to emit light into one seam 30. In such embodiments, such as shown in FIG. 3, a first light source 10B-1 can emit light of the same or similar colors displayed in the first portion 42-1 of the image 16 into the center seam 30B. The first light source 10B-1 can be oriented to direct the emitted light toward the first user 18A. In some embodiments, the first light source 10B-1 is positioned to the left of the seam 30B in the perspective of FIG. 3 (or on the second side of the reference plane defined by the seam 30B).

A second light source 10B-2 can emit light of the same or similar colors displayed in the second portion 42-2 of the image 16 into the center seam 30B. The position and orientation of the second light source 10B-2 is selected to direct its emitted light toward the second user 18B. The second light source 10B-2 may be positioned to the right of the seam 30B in the perspective of FIG. 3 (or on the first side of the reference plane defined by the seam 30B).

In other embodiments, only one light source 10 is provided to emit light into each seam 30. In such embodiments, the one light source 10 may emit a neutral color or a color complimentary to each of the first image portion 42-1 and the second image portion 42-2. For example, the system 9 can cause a single light source 10 to emit light that is an average of the color and/or brightness of light displayed in two or more image portions 42.

As further shown in FIGS. 2A-3, the system 9 may include a diffusor 36 positioned between the light source 10 and the mirror array 6. The diffuser 36 is operable to diffuse or blend the light emitted by the light source 10. In some embodiments, the system 9 may not include the diffusor 36. The diffuser 36 may be formed of any material capable of diffusing or blending the light including, but not limited to, silicone, latex, closed-cell foam, plastic, glass, fabrics, semi-transparent or transparent material, or the like. In at least one embodiment, the diffusor 36 comprises a compressible or flexible material. Additionally, or alternatively, the diffusor 36 is formed of a translucent or partially transparent material.

The diffusor 36 and the light source 10 may be formed together as one unit or may be separate pieces. In the illustrated embodiments shown in FIGS. 2A-C and 3, the diffusor 36 is disposed proximate to the rear surface 20 of the mirror array 6 and covers the seam 30. In other embodiments, the diffusor 36 may be disposed at least partially (or completely) in the seam 30. Additionally, or alternatively, the diffusor 36 may extend beyond the front surface 22 of the mirror array 6.

In at least one embodiment, the diffusor 36 is sized to cover beveled edges of the mirrors 28 facing the seam 30. More specifically, in some simulators 2, the mirrors 28 include an edge beveled at an angle of between 40° and 50°, or approximately 45°. The beveled edges of the mirrors 28 contribute to the appearance of the seam 30 viewed by the user as much as the actual seam 30 between the mirrors 28. Accordingly, in some embodiments, the diffusor 36 is configured to fit into the seam 30 and cover the beveled edges of the mirrors 28.

Figure 4A:
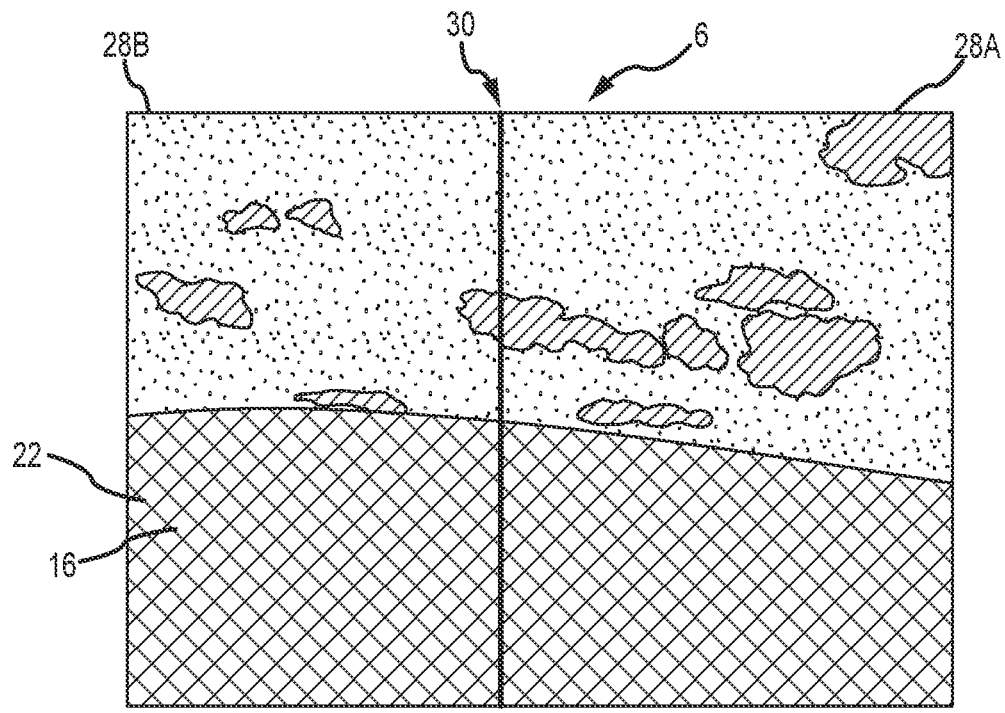
FIG. 4A is a front elevation view of an image displayed on a mirror array of a simulator and illustrating the appearance of a seam between adjacent mirrors.
Figure 4B:
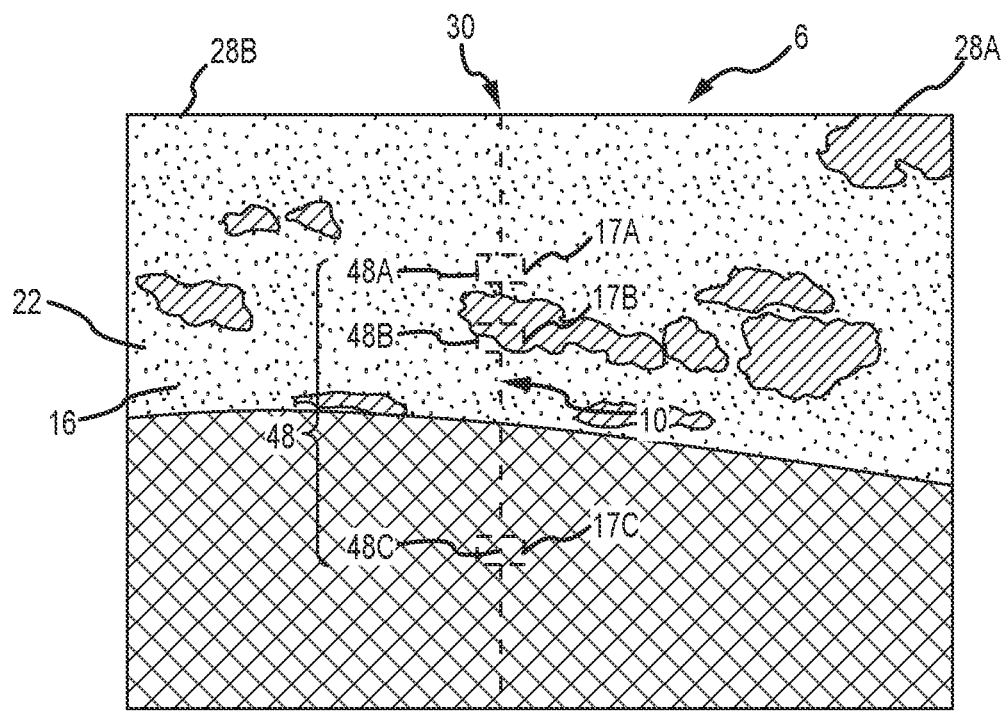
FIG. 4B is another front elevation view of the image shown in FIG. 4A with a light source of an active seam reduction system emitting light into the seam to reduce the appearance of the seam.

Referring now to FIGS. 4A and 4B, a view of a seam 30 without the light source 10 activated and with the light source 10 activated, respectively, are shown. FIGS. 4A and 4B generally illustrate an image 16 of a landscape with a sky of a first color (which is illustrated as a dot pattern to represent the color blue), clouds of a second color (illustrated as a hash pattern to indicate the color white), and ground of a third color (such as the color green which is indicated by a cross pattern).

As shown in FIG. 4A, the seam 30 causes a break in the image 16 and appears as a dark, vertical line visible to the user 18. To actively reduce visibility of the seam 30, the light source 10 is disposed in the seam 30 or behind the seam to emit light into the seam, as shown in FIG. 4B.

During operation of the active seam reduction system 9, the seam 30 may be divided into one or more portions 48. For example, as shown in FIG. 4B, the seam 30 is divided into a first portion 48A, a second portion 48B and a third portion 48C, although it will be appreciated that the seam 30 may be divided into any number of portions 48. Each of the seam portions 48 is associated with a zone 17 of the image 16 on the screen 4. Though zones 17 are shown on the reflected image in FIG. 4B, this is merely for illustrative convenience. More specifically, the zones 17 indicate portions of the image 16 on the screen 4 that are collected by a camera 12. In at least one embodiment, each zone 17 is associated with up to approximately a 10° vertical field of view of the image 16 on the screen 4. In other embodiments, the zones 17 are associated with between approximately 1° and 10°, or about 5° of the vertical field of view of the image 16 on the screen 4.

As will be described in detail herein with respect to FIGS. 6 and 7, the light source 10 or light sources 10 associated with the seam 30 may each emit light in a color equal or similar to the color of the image 16 viewed from the perspective of a user 18 adjacent to the first, second and third portions 48A, 48B, 48C of the seam. As illustrated in FIG. 4B, the light emitted by the light source 10 into the first portion 48A is a first color (illustrated as the dot pattern) and corresponds to the first color of light in the first zone 17A, the light emitted into the second portion 48B is a second color (illustrated as the hash pattern) to match the second color of light in the second zone 17B, and in the third portion 48C the light source emits a third color (illustrated as a cross pattern) of light to blend with the third color of light of the third zone 17C, thereby visually blending the image 16 at the seam 30 together.

In the embodiment illustrated in FIG. 4B, the light source 10 is a strip of LED lights. In at least one embodiment, the strip of LED lights includes individual LEDs that can emit a single color of light. More specifically, the LED strip includes LEDs that emit red light, LEDs that emit green light, and LEDs that emit blue light. Alternatively, in other embodiments, the light source 10 may be a single unit capable of producing different lights (e.g., colors, wavelengths) in various portions 48 of the seam 30. In some embodiments, the light source 10 appears as a uniform "glow" from the seam 30 and not as individual lights. In at least one embodiment, the light source 10 may appear as individual lights. As previously described, a diffusor 36 may be positioned between the light source 10 and the seam 30 to diffuse the light from the light source 10. The diffusor 36 blends the light from each point source (e.g., each LED, each laser, or the like) into an adjacent point source without a gap.

In other embodiments, the light source 10 may comprise a plurality of individual lights. The individual lights are spaced apart by a predetermined distance. Although the individual lights of the light source 10 are illustrated as being spaced apart in FIG. 4B for clarity, one of skill in the art will appreciate that individual lights of a light source 10 of the present invention may be spaced together very closely such that there is no noticeable gap or space between adjacent lights. For example, in at least one embodiment, the light source 10 includes light producing elements, such as LED lights, that are separated by less than 5 mm. Optionally, the light source includes individual lights that are separated by between about 0.1 mm and about 10 mm.

Referring now to FIG. 5, the active seam reduction system 9 may include a control system 14 in communication with the light source 10 and the camera 12. The control system 14 according to embodiments of the present disclosure may comprise a processor 50, a memory 52, a communication interface 54, and a user interface 56. A control system such as control system 14 in some embodiments may have more components or fewer components than the control system 14 shown in FIG. 5. The control system 14 may be any suitable computer known to one of skill in the art, such as a personal computer (PC) or a laptop computer.

The processor 50 of the control system 14 may be any processor known to one of skill in the art, including a processor described herein or any similar processor. The processor 50 may be configured to execute instructions stored in the memory 52, which instructions may cause the processor 50 to carry out one or more computing steps utilizing or based on data received from the user interface 56 and/or camera 12.

The memory 52 may be or comprise RAM, DRAM, SDRAM, other solid-state memory, any memory described herein, or any other tangible, non-transitory memory for storing computer-readable data and/or instructions. The memory 52 may store information or data useful for completing any step of the methods 66 or 78 described herein. The memory 52 may store, for example, one or more image processing algorithms 60, one or more color determination algorithms 62, and/or one or more controller instructions 64. Such instructions or algorithms may, in some embodiments, be organized into one or more applications, modules, packages, layers, or engines. The algorithms and/or instructions may cause the processor 50 to manipulate data stored in the memory 52 and/or received from the camera 12.

The control system 14 may also comprise a communication interface 54. The communication interface 54 may be used for receiving information from an external source (such as the camera 12), and/or for transmitting instructions, data, or other information to an external system or device (e.g., the camera 12 and/or the light source 10). The communication interface 54 may comprise one or more wired interfaces (e.g., a USB port, an ethernet port, a Firewire port) and/or one or more wireless interfaces (configured, for example, to transmit information via one or more wireless communication protocols such as 802.11a/b/g/n, Bluetooth, NFC, Zig-Bee, and so forth). In some embodiments, the communication interface 54 may be useful for enabling the control system 14 to communicate with one or more other processors 50 or other control systems 14, whether to reduce the time needed to accomplish a computing-intensive task or for any other reason.

The control system 14 may also comprise one or more user interfaces 56. The user interface 56 may be or comprise a touchpad (for example, of a laptop computer), keyboard, mouse, trackball, monitor, television, touchscreen, joystick, switch, button, and/or any other device for receiving information from a user and/or for providing information to a user. The user interface 56 may be used, for example, to receive a user selection or other user input regarding the image processing algorithm 60; to receive a user selection or other user input regarding the color determination algorithm 62; to receive user input useful in connection with the controller instructions 64; and/or to display the instructions 64. In some embodiments, the user interface 56 may be useful to allow a user or operator to modify the instructions 64, the light source 10, or other information displayed, although it will be appreciated that each of the preceding inputs may be generated automatically by the control system 14 (e.g., by the processor 50 or another component of the control system 14) or received by the control system 14 from a source external to the control system 14. In some embodiments, user input such as that described above may be optional or not needed for operation of the systems, devices, and methods described herein.

Although the user interface 56 is shown as part of the control system 14, in some embodiments, the control system 14 may utilize a user interface 56 that is housed separately from one or more remaining components of the control system 14. In some embodiments, the user interface 56 may be located proximate one or more other components of the control system 14, while in other embodiments, the user interface 56 may be located remotely from one or more other components of the control system 14.

In the illustrated embodiment, the light source 10 also includes a controller 58, although in some embodiments the active seam reduction system 9 may not include the controller 58. The controller 58 is operable to control the light source 10 to cause the light source 10 to emit light.

The controller 58 may be an electronic, a mechanical, or an electro-mechanical controller. The controller 58 may comprise or may be any processor described herein. The controller 58 may comprise a memory storing instructions for executing any of the functions or methods described herein as being carried out by the controller 58. In some embodiments, the controller 58 may be configured to simply convert signals received from the control system 14 (e.g., via a communication interface 54) into commands for operating the light source 10 and/or the camera 12. In other embodiments, the controller 58 may be configured to process and/or convert signals received from the light source 10 and/or the camera 12. Further, the controller 58 may receive signals from one or more sources (e.g., the light source 10 and/or the camera 12) and may output signals to one or more sources.

Figure 6:
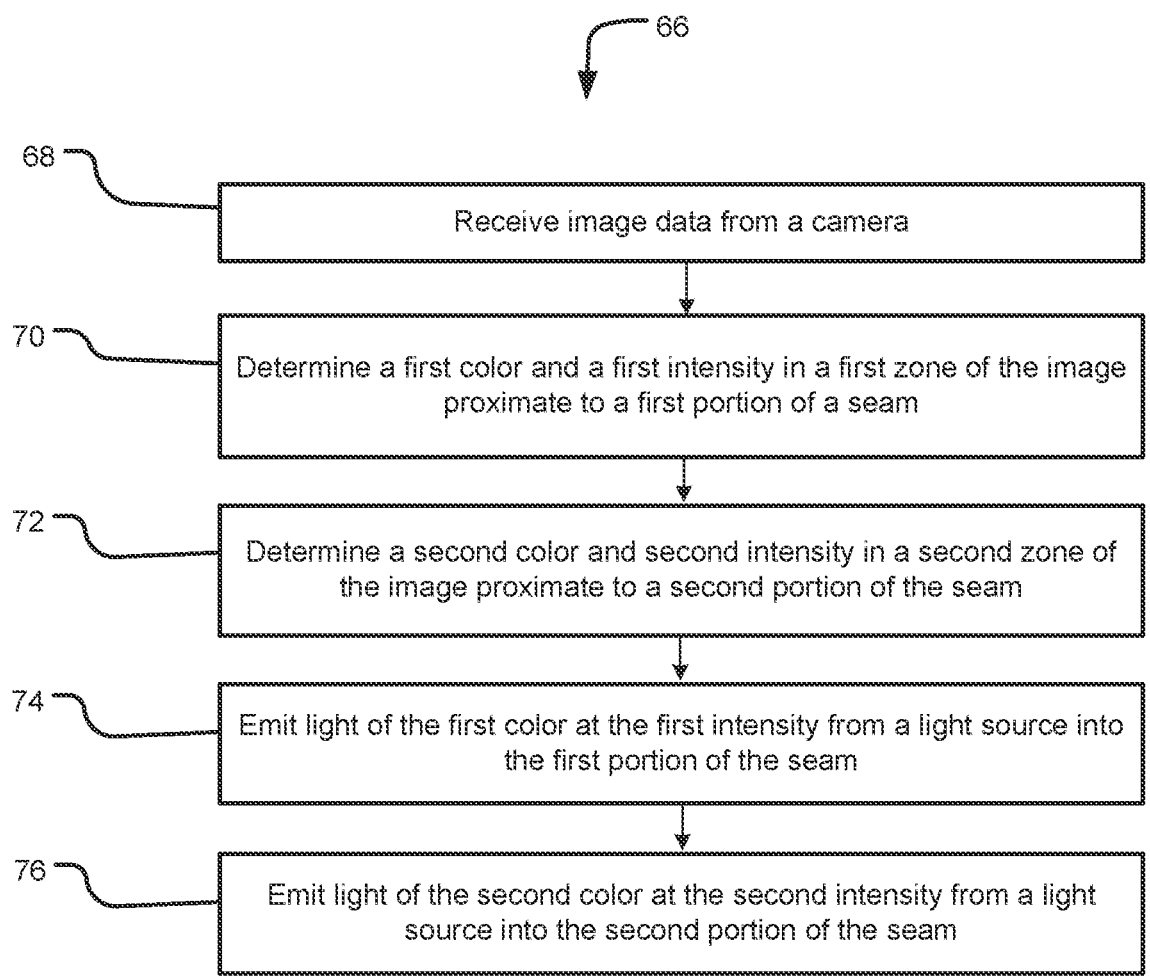
FIG. 6 is a flow chart illustrating a method of reducing the appearance of a seam according to at least one embodiment of the present disclosure.

Turning now to FIG. 6, a method 66 for reducing the appearance of a seam 30 in an image 16 reflected onto a mirror array 6 from a screen 4 is provided. The method 66 may be performed using, for example, the system 9 described above with respect to FIGS. 1-5.

The method 66 comprises receiving image data from the camera 12 (step 68). As illustrated in FIGS. 2A-C and 3, the image data is related to the image 16 as projected on the concave 24 or convex side 26 of the screen 4. More specifically, in at least one embodiment, the camera 12 is oriented toward the convex side 26 of the screen. Additionally, or alternatively, the system 9 optionally includes a camera oriented toward the concave side 24 of the screen 4. Processing of the image data may include applying the image processing algorithm 60 to the image data (or, alternatively, inputting the image data to the image processing algorithm 60), which algorithm 60 may limit the image data received from the camera 12 and/or limit the image data analyzed to no less than a size of the seam 30 as viewed by the user 18.

The method 66 also comprises determining a first color or wavelength of light and optionally a first intensity in a first zone 17A of the image 16 associated with a first portion 48A of the seam 30 as viewed by the user 18 (step 70). Determining the first color in step 70 may also include determining a brightness or an intensity of the image 16 in the first zone 17A and generating instructions 64 to cause the light source 10 to emit the first color of light into the first seam portion 48A at a first intensity. The color determination algorithm 62 may be applied to determining the first color and first intensity of light in the first zone 17A and to generate the instructions 64 to cause the light source 10 to emit the first color of light at the first intensity into the first seam portion 48A.

Determining the first color in the first zone 17A may include identifying at least one of an average color of the image 16 in the first zone 17A and determining a count of each color of the first zone 17A. The color with the highest count may then be identified as the color for the first zone 17A.

The average color of the image 16 in the first zone 17A can be determined by the color determination algorithm 62 using any suitable method known to those of skill in the art. In at least one embodiment, the color determination algorithm 62 uses one or more transfer-function methods such as (a) area intensity averaging, (b) running average box-car filtering, (c) finite impulse response filtering, (d) frequency-shift data replacement, and (e) individual red, green, and blue intensity modulation to determine the average color in the first zone 17A of the image. In some embodiments, the first color and/or brightness are determined by the user or operator via the user interface 56.

The method 66 also optionally comprises determining a second color or wavelength of light and optionally a second intensity in a second zone 17B of the image 16 associated with a second portion 48B of the seam 30 (step 72). The color determination algorithm 62 may be applied to determine the second color of light in the second zone 17B and to generate the instructions 64 to cause the light source 10 to emit the second color of light into the second seam portion 48B at a second intensity.

Determining the second color in the second zone 17B may include identifying at least one of an average color of the image 16 in the second zone 17B and determining a count of each color of the second zone 17B. The color with the highest count may then be identified as the color for the second zone 17B. Determining the second color may also include determining a brightness or intensity of the image 16 in the second zone 17B and generating instructions 64 to cause the light source 10 to emit the second color of light into the second portion 48B of the seam 30 at a second intensity. In some embodiments, the second color and/or brightness are determined by the user or operator via the user interface 56.

The method 66 further comprises emitting light of the first color at the first intensity from the light source 10 into the first portion 48A of the seam 30 (step 74) and emitting light of the second color at the second intensity from the light source 10 into the second portion 48B of the seam 30 (step 76), thereby providing light of colors and intensities in the seam 30 to substantially match colors of light of the image 16 reflected from the pair of mirrors 28 adjacent to the seam 30. As previously described, such light emitted blends with the image 16 reflected on the pair of mirrors 28A, 28B adjacent to the seam 30, thereby producing a seamless image 16 to the user 18 viewing the image 16 as reflected on the mirror array 6.

In some embodiments, step 74 includes emitting light of a first color and intensity into a seam 30 from a first light source associated with a first user 18A. Similarly, step 76 includes emitting light of a first color and intensity into the seam 30 from a second light source associated with a second user 18B. More specifically, as generally illustrated in FIG. 3, the system 9 of at least one embodiment of the present disclosure may include two light sources 10B-1 and 10B-2 associated with a single seam, such as center seam 30B. Accordingly, the control system 14 can send instructions 64 to the first light source 10B-1 to reduce the appearance of the seam 30B as viewed by the first user 18A. The control system 14 can also send instructions 64 to the second light source 10B-2 to reduce the appearance of the seam 30B as observed by the second user 18B.

It will be appreciated that the method 66 may include more steps for determining colors for more than two zones 17 of the image 16 and emitting light from the light source 10 into more than two seam portions 48 or less steps for determining a color for one zone 17 of the image 16 and emitting light into one seam portion 48. The method 66 may also further include determining a brightness or intensity of the image 16 in any zone 17 and generating instructions to cause the light source 10 to emit a color of light into the corresponding seam portion 48 at a corresponding intensity.

Figure 7:
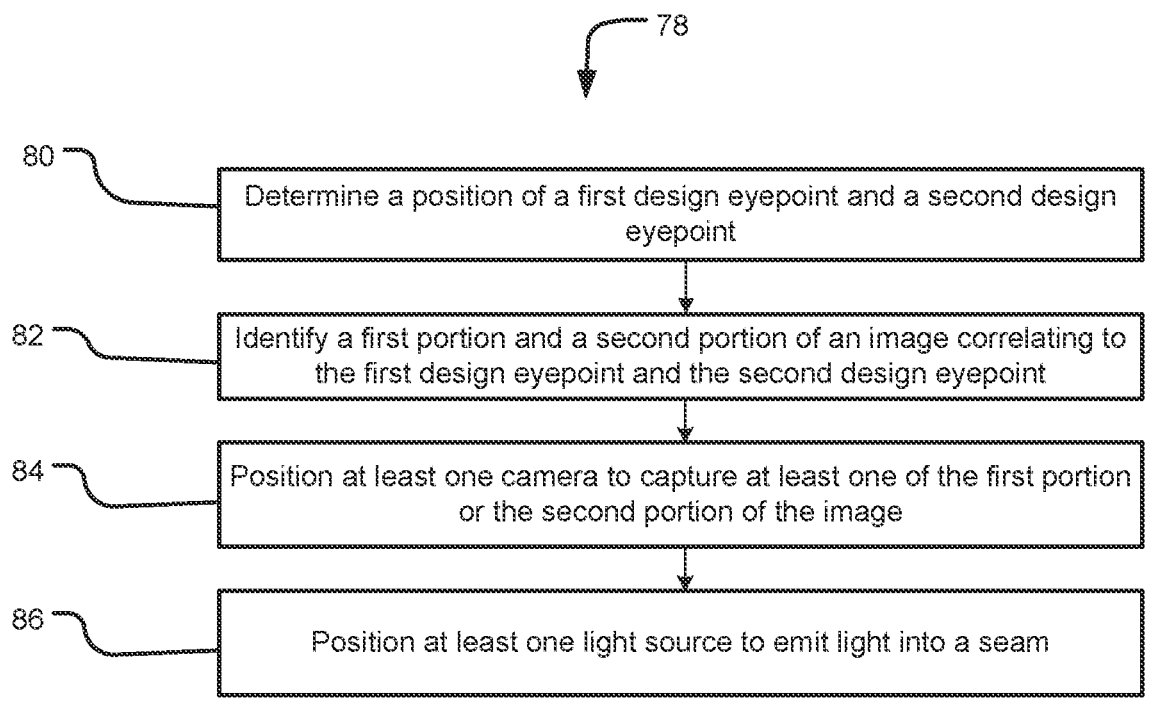
FIG. 7 is another flow chart that generally illustrates a method for calibrating an active seam reduction system according to at least one embodiment of the present disclosure.

Turning now to FIG. 7, a method 78 for calibrating an active seam reduction system 9 is provided. The method 78 may be performed using, for example, the system 9 described above with respect to FIGS. 1-5. The method 78 may be performed prior to or during the method 66. For example, the method 78 may be performed prior to the method 66 to position and orient the camera(s) 12 or calibrate an image processing algorithm 60 for use during, for example, a flight simulation by a simulator 2. In another example, the method 78 may be performed when it is determined that the system 9 is not calibrated as used during method 66. Method 66 may be paused for method 78 to be performed, then method 66 may be resumed upon completion of method 78.

The method 78 comprises determining a position of a first design eyepoint 40-1 correlating to a position of a first user 18A and a second design eyepoint 40-2 correlating to a position of a second user 18B (step 80). As previously described in conjunction with FIG. 3, the first design eyepoint 40-1 and the second design eyepoint 40-2 correlate to positions of a first user 18A and a second user 18B, respectively, and how each user views the seam 30. In other embodiments, there may be more than two users. In some embodiments, the first user is a pilot and the second user is a co-pilot. A corresponding first viewpoint 44-1 and a second viewpoint 44-2 represent the viewpoints of the first user and the second user, respectively. As previously illustrated, the viewpoints 44-1 and 44-2 are different for each of the two users 18A, 18B when the two users 18A, 18B are looking at the same seam, such as the center seam 30B shown in FIG. 3.

The method 78 also comprises identifying a first portion 42-1 and a second portion 42-2 of an image 16 correlating to the first design eyepoint 40-1 and the second design eyepoint 40-2, respectively (step 82). The first portion 42-1 and the second portion 42-2 are based on the respective viewpoints 44-1 and 44-2 and correlate to the image 16 as seen by each user in or near the seam 30.

In some embodiments, identifying the first portion 42-1 and the second portion 42-2 is performed manually by a user. In other embodiments, the first portion 42-1 and the second portion 42-2 are automatically identified by a first camera 41-1 positioned at the first design eyepoint 40-1 and a second camera 41-2 positioned at the second design eyepoint 40-2. The first camera and the second camera may be configured to automatically capture and identify the first portion 42-1 and the second portion 42-2 as seen from the first design eyepoint 40-1 (e.g., the pilot or co-pilot) and the second design eyepoint 40-2 (e.g., the pilot or co-pilot), respectively. It will be appreciated that embodiments with one viewpoint (or more than two viewpoints) may include a respective camera for each viewpoint. It will also be appreciated that a single camera can be calibrated to capture multiple viewpoints.

The method 78 also comprises positioning and orienting at least one camera 12 to capture image data of at least one of the first portion 42-1 and the second portion 42-2 (step 84) of the image 16 on the screen 4. In some embodiments, the at least one camera 12 comprises as many cameras as users for each seam 30. For example, and referring again to FIG. 3, a first camera 12B-1 may capture the first portion 42-1 of the image 16 interrupted by the center seam 30B as viewed by the first user 18A. Additionally, or alternatively, a second camera 12B-2 may capture the second portion 42-2 of the image 16 interrupted by the center seam 30B as viewed by the second user 18B.

In some embodiments, the at least one camera 12 comprises only one camera positioned to capture image data for each seam 30. In such embodiments, an image processing algorithm 60 may be calibrated to identify portions 42 of the image data captured by the camera 12 that correspond to a viewpoint 44 of each of two users 18A, 18B. For example, as generally illustrated in FIG. 3, a single camera 12A is associated with seam 30A. During the calibration of the system 9, the position and orientation of the camera 12A may be optimized to merge or average the image data collected by the camera for the two uses 18A, 18B. In such embodiments, the camera 12A may have a wide field and/or include a wide-angle lens. In this manner, the position of the camera 12A could be adjusted to collect image data on the two portions of the image 16 viewed by two users 18A, 18B, such as a pilot and a copilot, looking toward the seam 30A. Additionally, a second camera 12A could be positioned proximate to seam 30A during performance of calibrating method 78.

Although the camera 12A is illustrated in FIG. 3 approximately centered on the seam 30A, during step 84, the camera 12A may be moved laterally either to the right or the left to improve performance of the system 9. More specifically, the position of the camera 12A relative to the seam 30A may vary depending on factors such as the radius of the mirrors 28A, 28B, the position of the seam 30A relative to the first and second users 18A, 18B, and the offset of the first and second design eyepoints 40-1, 40-2 from the optical centerline of the mirror array 6. For example, in a mirror array 6 with five mirrors 28, the position of a first seam 30A between a first mirror 28A and a second mirror 28B may be different relative to the users 18A, 18B than the position of the first seam 30A illustrated in FIG. 3.

Method 78 may also include positioning and orienting at least one light source 10 to emit light into a seam 30 of the mirror array 6 (step 86). As described herein, the light source 10 can be positioned proximate to a rear surface 20 of the mirror array. Optionally, the light source 10 may extend at least partially into the seam 30. In some embodiments, the light source 10 is configured to direct light in a predetermined direction. Accordingly, in step 86, the orientation and position of the light source 10 may be adjusted relative to the seam 30.

In at least one embodiment, the system 9 may include two light sources 10 associated with a single seam 30. More specifically, as generally illustrated in FIG. 3, the system 9 of at least one embodiment of the present disclosure includes two light sources 10B-1 and 10B-2 associated with a single seam, such as center seam 30B. Accordingly, step 86 may include positioning a first light source 10B-1 to emit light into the seam 30B toward a position of a first user 18A. Similarly, step 86 may include positioning a second light source 10B-2 to emit light into the seam 30B toward a position of a second user 18B.

The methods and systems described herein provide active seam reduction using a camera, a light source, and a control system to reduce visualization of a seam as viewed by a user in real-time. The methods and system advantageously blend the image at the seam so that the image appears seamless to the user. Such active seam reduction improves the realism of the image to the user, thereby improving the simulation experience.

As may be appreciated based on the foregoing disclosure, the present disclosure encompasses methods with fewer than all of the steps identified in FIGS. 6 and 7 (and the corresponding description of the methods 66 and 78), as well as methods that include additional steps beyond those identified in FIGS. 6 and 7 (and the corresponding description of the methods 66 and 78). While a general order of the methods 66 and 78 is shown in FIGS. 6-7, it will be understood by one of skill in the art that the steps of the methods can be arranged and performed differently than those shown in FIGS. 6-7. Further, although the steps of the methods may be described sequentially, many of the steps may in fact be performed in parallel or concurrently.

While various embodiments of the system have been described in detail, it is apparent that modifications and alterations of those embodiments will occur to those skilled in the art. It is to be expressly understood that such modifications and alterations are within the scope and spirit of the present disclosure. Further, it is to be understood that the phraseology and terminology used herein is for the purposes of description and should not be regarded as limiting. The use of "including," "comprising," or "having" and variations thereof herein are meant to encompass the items listed thereafter and equivalents thereof, as well as, additional items.

Several variations and modifications of the disclosure can be used. It would be possible to provide for some features of the disclosure without providing others.

The features of the various embodiments described herein are not intended to be mutually exclusive. Instead, features and aspects of one embodiment may be combined with features or aspects of another embodiment. Additionally, the description of a specific element with respect to one embodiment may apply to the use of that specific element in another embodiment, regardless of whether the description is repeated in connection with the use of the specific element in the other embodiment.

Suitable control systems 14 are known to those of skill in the art. In some embodiments, the control system 14 is a personal computer, such as, but not limited to, a personal computer running the MS Windows operating system. Optionally, the control system can be a smart phone, a tablet computer, a laptop computer, and similar computing devices. In other embodiments, the control system is a data processing system which includes one or more of, but is not limited to: an input device (e.g. a keyboard, mouse, or touch-screen); an output device (e.g. a display, a speaker); a graphics card; a communication device (e.g. an Ethernet card or wireless communication device); permanent memory (such as a hard drive); temporary memory (for example, random access memory); computer instructions stored in the permanent memory and/or the temporary memory; and a processor.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

One aspect of the disclosure comprises any one or more of the aspects/embodiments as substantially disclosed herein.

Another aspect of the disclosure is any one or more of the aspects/embodiments as substantially disclosed herein optionally in combination with any one or more other aspects/embodiments as substantially disclosed herein.

It is another aspect of the present disclosure to provide one or more means adapted to perform any one or more of the above aspects/embodiments as substantially disclosed herein.

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARIV1926EJ-S™ processors, other industry-equivalent processors, and may perform computational functions using any known or future-developed standard, instruction set, libraries, and/or architecture.

To provide additional background, context, and to further satisfy the written description requirements of 35 U.S.C. § 112, the following references are incorporated by reference herein in their entireties: U.S. Publication No. 2008/0206720; U.S. Publication No. 2020/0159104; U.S. Pat. Nos. 10,113,707; 10,338,875; and WO Publication No. 2020/106760.

What is claimed is:

1. A flight simulator for training a user to operate an aircraft, comprising:
    a display system to simulate a view out of a window of the aircraft, comprising:
        a screen;
        a projector operable to generate an image that is displayed on the screen; and
        a mirror array to reflect the image to a design eye point of the simulator, the mirror array including a first mirror, a second mirror adjacent to the first mirror, and a seam between the first and second mirrors;
    an active seam reduction system, comprising:
        a light source to emit light into the seam; and
        a camera oriented toward the screen to collect data on the image displayed on the screen; and
    a control system in communication with the light source and the camera, the control system operable to:
        receive data from the camera;
        determine a first color in a first zone of the image and a second color in a second zone of the image based on the data from the camera; and
        generate instructions to cause the light source to emit light of the first color into a first portion of the seam and to emit light of the second color into a second portion of the seam, thereby providing colors in the seam to substantially match colors in the image reflected onto the first and second mirrors adjacent to the seam.

2. The flight simulator of claim 1, wherein the control system is further operable to:
    determine a brightness or intensity of the image in the first and second zones;
    generate an instruction to cause the light source to emit the first color of light into the first seam portion at a first intensity; and
    generate an instruction to cause the light source to emit the second color of light into the second seam portion at a second intensity.

3. The flight simulator of claim 1, wherein the control system determines the first color in the first zone of the image by one or more of:
    identifying an average color of the image in the first zone; and determining a count of each color of the first zone and identifying the color with a highest count.

4. The flight simulator of claim 1, wherein the projector is positioned to project the image on a convex side of the screen.

5. The flight simulator of claim 1, wherein the projector is positioned to project the image on a concave side of the screen.

6. The flight simulator of claim 1, wherein an optical axis of the camera is oriented toward a convex side of the screen, and wherein the light source is oriented toward a convex rear surface of the mirror array.

7. The flight simulator of claim 1, wherein an optical axis of the camera is oriented toward a concave side of the screen, and wherein the light source is oriented toward a convex rear surface of the mirror array.

8. The flight simulator of claim 1, further comprising a diffusor positioned between the light source and the mirror array to diffuse the light emitted by the light source.

9. A system to reduce the appearance of a seam in an image reflected onto a mirror array from a screen, comprising:
a light source to emit light into the seam defined by a void between a pair of mirrors of the mirror array, the light source positioned proximate to a rear surface of the mirror array;
a camera to take a picture of the image projected onto the screen and yielding image data from the picture, the screen spaced from a front surface of the mirror array; and
a control system in communication with the light source and the camera, the control system operable to:
receive the image data from the camera;
determine a first color in a first zone of the image and a second color in a second zone of the image based on the image data; and
generate instructions to cause the light source to emit light of the first color into a first portion of the seam and to emit light of the second color into a second portion of the seam, thereby providing color in the seam to substantially match colors in the image reflected onto the pair of mirrors adjacent to the seam.

10. The system of claim 9, wherein the control system is further operable to:
determine a brightness of the image in the first and second zones; and
generate instructions to cause the light source to emit the first color of light into the first seam portion at a first intensity and to emit the second color of light into the second seam portion at a second intensity.

11. The system of claim 9, wherein the light source includes one or more of: a cathode ray tube; an LED; a liquid crystal display; an organic light-emitting diode (OLED); active-matrix liquid-crystal display (AMLCD); a digital light processing (DLP) projector; a surface-conduction electron-emitter display (SED); a field-emission display (FED); a quantum dot display; a laser; and a plasma display, and wherein the light source can emit full spectrum light including infrared light, visible light, and ultraviolet light.

12. The system of claim 9, wherein the camera is positioned offset from the seam.

13. The system of claim 9, wherein the camera comprises a first camera associated with a first user, and wherein the system comprises a second camera that is associated with a second user.

14. The system of claim 13, wherein the light source comprises a first light source to emit light through the seam toward the first user, and wherein the system comprises a second light source to emit light through the seam toward the second user.

15. The system of claim 9, wherein the system is associated with a flight simulator comprising:
a flight simulation software that generates the image; and
a projector for projecting the image onto the screen.

16. The system of claim 9, further comprising a diffusor positioned between the light source and the mirror array for diffusing or blending the light emitted by the light source.

17. A method of reducing the appearance of a seam in an image reflected onto a mirror array from a screen, comprising:
providing an active seam reduction system including a light source and a camera;
receiving image data from the camera, the image data related to the image displayed on the screen;
determining a first color in a first zone of the image associated with a first portion of the seam, the seam defined by a void between a pair of mirrors of the mirror array;
determining a second color in a second zone of the image associated with a second portion of the seam;
emitting light of the first color from the light source into the first portion of the seam; and
emitting light of the second color from the light source into the second portion of the seam, thereby providing color in the seam to substantially match colors in the image reflected onto the pair of mirrors adjacent to the seam.

18. The method of claim 17, further comprising:
determining a brightness of the first color and a brightness of the second color;
emitting the first color of light into the first seam portion at a first intensity; and
emitting the second color of light into the second seam portion at a second intensity.

19. A flight simulator for training a user to operate an aircraft, comprising:
a display system to simulate a view out of a window of the aircraft, comprising:
a screen;
a projector operable to generate an image that is displayed on the screen; and
a mirror array to reflect the image to a design eye point of the simulator, the mirror array including a first mirror, a second mirror adjacent to the first mirror, and a seam between the first and second mirrors; and
an active seam reduction system, comprising:
a light source to emit light into the seam;
a diffusor positioned between the light source and the mirror array to diffuse the light emitted by the light source; and
a camera oriented toward the screen to collect data on the image displayed on the screen.

20. The flight simulator of claim 19, wherein the light source is oriented toward a convex rear surface of the mirror array.

* * * * *